United States Patent
Zhou et al.

(10) Patent No.: US 9,932,475 B2
(45) Date of Patent: *Apr. 3, 2018

(54) TEMPERATURE-RESISTANT SILICONE RESINS

(71) Applicant: THE BOEING COMPANY, Chicago, IL (US)

(72) Inventors: Chaoyin Zhou, Chino, CA (US); Andrew P. Nowak, Los Angeles, CA (US); Richard E. Sharp, Weldon Spring, MO (US); Wen Li, Irvine, CA (US); James E. French, Ballwin, MO (US)

(73) Assignee: THE BOEING COMPANY, Chicago, IL (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/061,459

(22) Filed: Mar. 4, 2016

(65) Prior Publication Data

US 2016/0185919 A1 Jun. 30, 2016

Related U.S. Application Data

(63) Continuation of application No. 14/329,885, filed on Jul. 11, 2014, now Pat. No. 9,309,359.

(51) Int. Cl.
| | |
|---|---|
| C08L 75/02 | (2006.01) |
| C08G 79/04 | (2006.01) |
| C08G 77/395 | (2006.01) |
| C08L 85/02 | (2006.01) |
| C08G 77/58 | (2006.01) |
| C08K 3/22 | (2006.01) |
| C08G 77/42 | (2006.01) |
| C08K 3/36 | (2006.01) |
| C08G 77/00 | (2006.01) |

(52) U.S. Cl.
CPC ............ C08L 85/02 (2013.01); C08G 77/395 (2013.01); C08G 77/42 (2013.01); C08G 77/58 (2013.01); C08G 79/04 (2013.01); C08K 3/22 (2013.01); C08K 3/36 (2013.01); C08G 77/80 (2013.01); C08K 2003/2265 (2013.01)

(58) Field of Classification Search
USPC ............................................ 528/10–43, 398
See application file for complete search history.

(56) References Cited

U.S. PATENT DOCUMENTS

| | | |
|---|---|---|
| 5,710,300 A | 1/1998 | Graiver et al. |
| 2005/0113491 A1 | 5/2005 | Warren et al. |

FOREIGN PATENT DOCUMENTS

| | | |
|---|---|---|
| DE | 10257079 A1 | 6/2004 |
| SU | 448206 | 6/1975 |
| SU | 1165685 | 7/1985 |
| SU | 1165685 A * | 7/1985 |

OTHER PUBLICATIONS

Extended European Search Report for European Application No. 15173794.7-1301 dated Feb. 10, 2015.
V. D. Lobkov, The Effect of Compounds of Phosphorus with Oxygen on Siloxane Polymers-II, Polymer Science U.S.S.R., Pergamon Press, Oxford, vol. 7, No. 2, Jan. 1965, pp. 318-324.
Office Action for U.S. Appl. No. 14/329,885 dated Jul. 22, 2015.
"The Condensation Reaction of Methylphosphonic Acid with a,w-diethoxydimethylsiloxanes" authored by Adrianov et al. and; published in Izvestiya Akademii Nauk SSSR, Seriya Khimicheskaya (1961) 1030-1035.
Abstract for CN 1022121174 (Oct. 2011).

* cited by examiner

*Primary Examiner* — Marc Zimmer
(74) *Attorney, Agent, or Firm* — Patterson + Sheridan, LLP

(57) ABSTRACT

Methods and formulations for modified silicone resins of Formula (I) are presented:

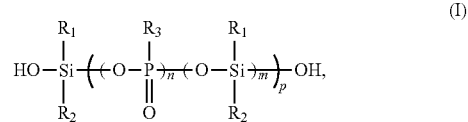

(I)

The $R^1$, $R^2$, and $R^3$ are each independently selected from a group consisting of H, alkyl, alkenyl, alkynyl, and aryl; n ranges from 1 to 10; m ranges from 1 to 200; and p ranges from 2 to 1,000. The elastomeric materials prepared from modified silicone resins display robust mechanical properties following prolonged exposure to high temperatures (e.g., 316° C. or higher).

38 Claims, No Drawings

TEMPERATURE-RESISTANT SILICONE RESINS

CROSS-REFERENCE TO RELATED APPLICATIONS

This application is a continuation of U.S. application Ser. No. 14/329,885 filed Jul. 7, 2014. The above-mentioned application is hereby incorporated by reference.

FIELD

The disclosure relates generally to methods and formulations for high temperature-resistant silicone resins.

BACKGROUND

A critical need exists for elastomers capable of performing in extreme thermal environments. Silicone polymers represent a group of elastomers owing to their inherent thermal and oxidative stabilities. Silphenylene siloxane polymers are known to be stable at high temperatures. This is due in part to the presence of the rigid silphenylene moiety that interferes with the siloxane redistribution reaction. Silphenylene siloxane polymers have been synthesized and investigated by several research groups over the past several decades (see, for example, Dvornic, P. R.; Lenz, R. W. *High-Temperature Siloxane Elastomers*; Huethig & Wepf Verlag: New York, 1990).

For example, Hundley and Patterson (N. H. Hundley and W. J. Patterson, "Formulation/Cure Technology for Ultra-High Molecular Weight Siphenylene-Siloxane Polymers" NASA Technical Paper 2476 (1985)) studied certain derivatives of silphenylene-siloxane (SPS) polymers having the formula shown below:

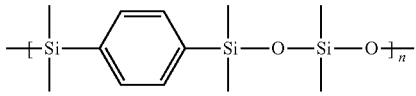

The main obstacle to use of these polymers and related carborane derivatives is their inability to be easily vulcanized to effect curing. Hundley and Patterson prepared derivatives of SPS polymers, wherein a vinyl group substituent replaced a methyl substituent, giving the modified SPS polymer formula shown below:

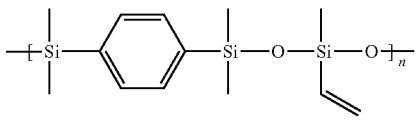

The inclusion of the vinyl substituent in such SPS polymer derivatives considerably improved curing by vulcanization. Importantly, such SPS polymer derivatives demonstrated improved thermal and oxidative stabilities over extant commercial silicone resin polymer formulations. Yet both elastomer formulations exhibited extensive degradation in mechanical properties after being exposed to 288° C. for 16 hr. (Id. at p. 10).

MacKnight and coworkers (U. Lauter et al. "Vinyl-Substituted Silphenylene Siloxane Copolymers: Novel High-Temperature Elastomers" *Macromolecules* 32, 3426-3431 (1999)) prepared and studied SPS polymer formulations that included 30~70 percent vinyl substitution as depicted by one exemplary formula shown below:

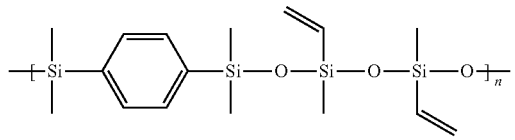

While these derivatives displayed greater thermal stability than prior formulations, the high temperature limit for possible applications of these materials as fire-safe elastomers extends to about 230° C.

Homrighausen and Keller (C. L. Homrighausen and T. M. Keller, "High-Temperature Elastomers from Silarylene-Siloxane-Diacetylene Linear Polymers," J. Polym. Sci. Part A: Polym. Chem. 40:88-94 (2002)) prepared and characterized linear silarylene-siloxane-diacetylene polymers having the formula shown below:

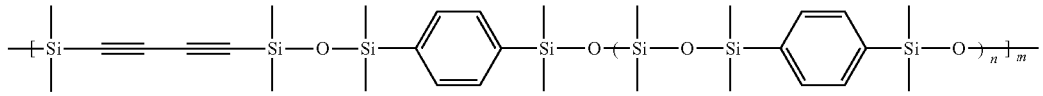

where n=1-3. Polymers that contain the vulcanizable acetylene moiety as part of the chain or as a pendant functional group are known in the art. In most cases, incorporation of the acetylene group improves the thermal stability of the respective polymers. The increase in thermal stability is believed to be due to generation of a cross-linked material. Yet elastomers based upon these polymers began to exhibit significant weight loss after a couple of hours at temperatures up to about 330° C. in air as determined by thermogravimetric analysis (TGA, Id.).

Additional compounds include those having phosphorous as a substituent, for example:

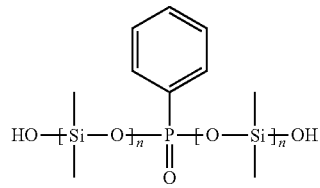

Poly[oxy(dimethylsilylene)], α,α'-(phenyl-phosphinylidene)bis[ω-hydroxy-] (CAS 1342156-21-1)

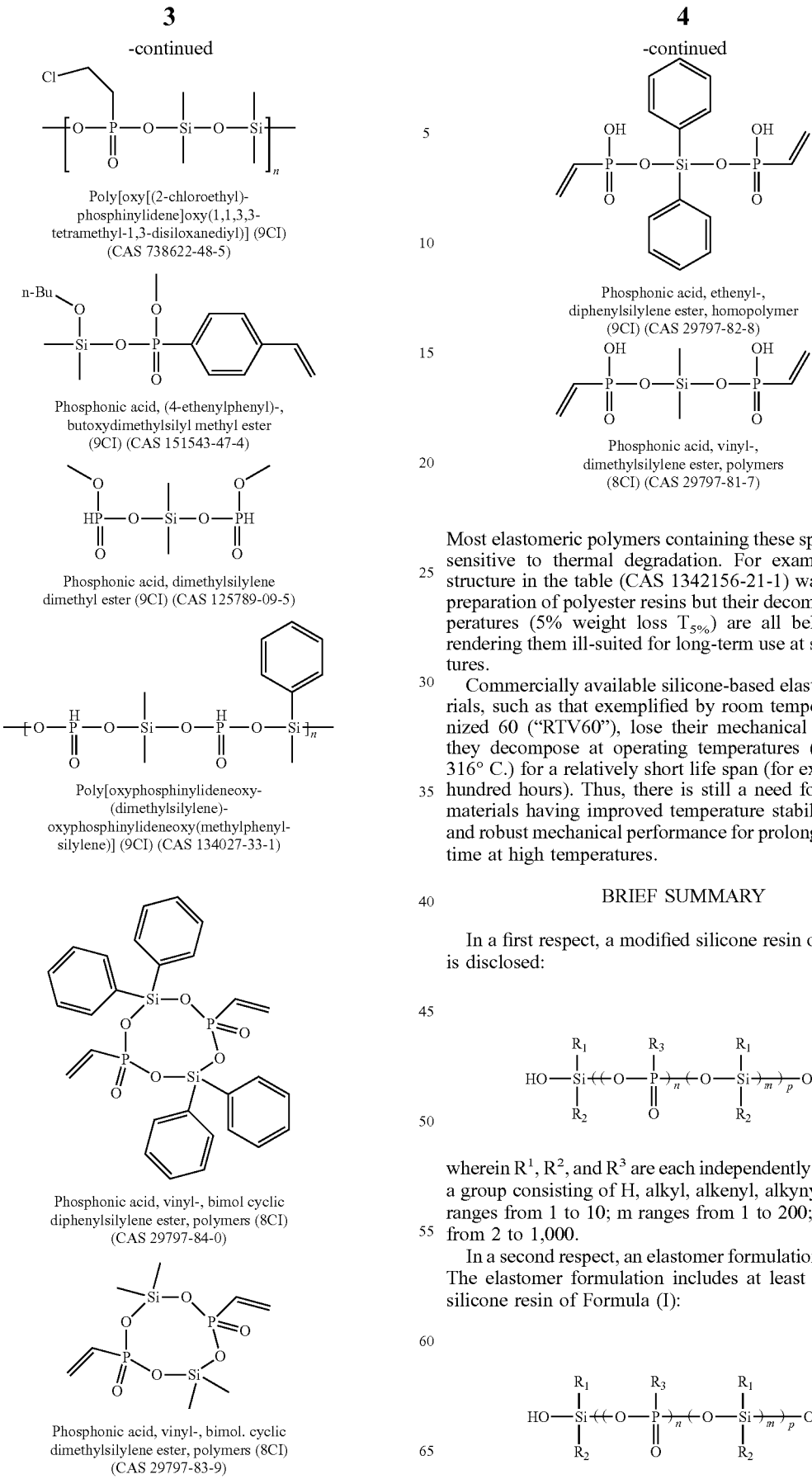

Most elastomeric polymers containing these species are also sensitive to thermal degradation. For example, the first structure in the table (CAS 1342156-21-1) was used in the preparation of polyester resins but their decomposition temperatures (5% weight loss $T_{5\%}$) are all below 300° C., rendering them ill-suited for long-term use at such temperatures.

Commercially available silicone-based elastomeric materials, such as that exemplified by room temperature vulcanized 60 ("RTV60"), lose their mechanical properties as they decompose at operating temperatures (for example, 316° C.) for a relatively short life span (for example, a few hundred hours). Thus, there is still a need for elastomeric materials having improved temperature stability, longevity and robust mechanical performance for prolonged periods of time at high temperatures.

BRIEF SUMMARY

In a first respect, a modified silicone resin of Formula (I) is disclosed:

wherein $R^1$, $R^2$, and $R^3$ are each independently selected from a group consisting of H, alkyl, alkenyl, alkynyl, and aryl; n ranges from 1 to 10; m ranges from 1 to 200; and p ranges from 2 to 1,000.

In a second respect, an elastomer formulation is disclosed. The elastomer formulation includes at least one modified silicone resin of Formula (I):

wherein $R^1$, $R^2$, and $R^3$ are each independently selected from a group consisting of H, alkyl, alkenyl, alkynyl, and aryl; n ranges from 1 to 10; m ranges from 1 to 200; p ranges from 2 to 1,000; at least one metal oxide; and at least one curing agent.

These and other features, objects and advantages will become better understood from the description that follows.

DETAILED DESCRIPTION

The composition and methods now will be described more fully hereinafter. These embodiments are provided in sufficient written detail to describe and enable a person having ordinary skill in the art to make and use the claims, along with disclosure of the best mode for practicing the claims, as defined by the claims and equivalents thereof.

Likewise, modifications and other embodiments of the methods described herein will come to mind to one of ordinary skill in the art having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of ordinary skill in the art. Although any methods and materials similar to or equivalent to those described herein can be used in the practice or testing of the claims, the exemplary methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one."

The term "about" means within a statistically meaningful range of a value or values such as a stated concentration, length, molecular weight, pH, time frame, temperature, pressure or volume. Such a value or range can be within an order of magnitude, typically within 20%, more typically within 10%, and even more typically within 5% of a given value or range. The allowable variation encompassed by "about" will depend upon the particular system under study.

Abbreviations "Ph," "Pr" and "Bu" refer to phenyl, propyl and butyl, respectively.

The terms "substituent", "radical", "group", "moiety" and "fragment" may be used interchangeably.

The number of carbon atoms in a substituent can be indicated by the prefix "$C_{A-B}$" where A is the minimum and B is the maximum number of carbon atoms in the substituent.

The term "alkyl" embraces a linear or branched acyclic alkyl radical containing from 1 to about 15 carbon atoms. In some embodiments, alkyl is a $C_{1-10}$ alkyl, $C_{1-6}$ alkyl or $C_{1-3}$ alkyl radical. Examples of alkyl include, but are not limited to, methyl, ethyl, propyl, isopropyl, butyl, isobutyl, tert-butyl, sec-butyl, pentan-3-yl (i.e., 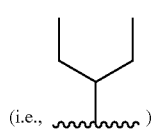)

and the like.

The term "alkenyl" refers to an unsaturated, acyclic hydrocarbon radical with at least one double bond. Such alkenyl radicals contain from 2 to about 15 carbon atoms. Non-limiting examples of alkenyl include ethenyl (vinyl), propenyl and butenyl.

The term "alkynyl" refers to an unsaturated, acyclic hydrocarbon radical with at least one triple bond. Such alkynyl radicals contain from 2 to about 15 carbon atoms. Non-limiting examples of alkynyl include ethynyl, propynyl and propargyl.

The verb forms of "comprise," "have" and "include," have the same meaning as used herein. Likewise, the verb forms of "describe", "disclose" and "provide" have the same meaning as used herein.

The term "aryl" refers to any monocyclic, bicyclic or tricyclic cyclized carbon radical, wherein at least one ring is aromatic. An aromatic radical may be fused to a non-aromatic cycloalkyl or heterocyclyl radical. Examples of aryl include phenyl and naphthyl.

The term "arylene" refers to a bivalent radical (as phenylene) derived from an aromatic hydrocarbon by removal of a hydrogen atom from each of two carbon atoms of the nucleus.

The term "transition metal," comprising the plural form thereof, refers to any element of d-block of the periodic table. Exemplary elements of a transition metal include those having atomic numbers 21 through 30, 39 through 48, 71 through 80, and 103-112.

The term "metal oxide" refers to a compound having a metal-oxygen bond, wherein oxygen has an oxidation number of −2. Exemplary metal oxides include sodium oxide, magnesium oxide, calcium oxide, aluminum oxide, lithium oxide, silver oxide, iron (II) oxide, iron (III) oxide, chromium (VI) oxide, titanium (IV) oxide, copper (I) oxide, copper (II) oxide, zinc oxide, and zirconium oxide.

The term "inorganic oxide" refers to a compound formed between a non-carbon element and oxygen. Exemplary inorganic oxides include metal oxides, silicone oxide, phosphate oxide, and borate oxide, among others.

The term "silica" refers to a compound consisting essentially of silicon dioxide and includes the formula $SiO_2$.

The term "silicate" refers to a compound that includes an anionic silicon compound. Exemplary silicates include ethyl silicate, methyl silicate, isopropyl silicate and butyl silicate, among others.

The term "silsesquioxane" refers to an organosilicon compound with the empirical chemical formula $RSiO_{3/2}$ where Si is the element silicon, O is oxygen and R is, for example, hydrogen, alkyl, alkene, aryl, or arylene group. The term "silsesquioxane" includes cage structures in which the units form a cage of n units in a designated $T_n$ cage; partially caged structures, in which the aforementioned cages are formed but lack complete connection of all units in the cage; ladder structures in which two long chains composed of $RSiO_{3/2}$ units are connected at regular intervals by Si—O—Si bonds; and random structures which include $RSiO_{3/2}$ unit connections without any organized structure formation.

The term "partially caged silsesquioxane" denotes a radical having the general formula:

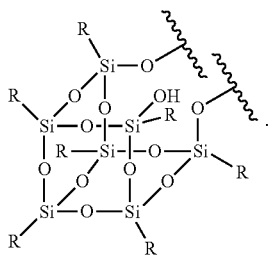

The terms "compound," "resin compound," and "modified silicone resin" are used interchangeably and have the same meaning when referring to Formulas (I) and (II).

The phrase "neat formulation" refers to a formulation consisting of a defined composition of specified components, wherein the total amount of the specified components of the defined composition sums to 100 weight-percent. A person of ordinary skill in the art will recognize that not all formulations are "neat formulations," as a formulation can comprise a defined composition of specified components, wherein the total amount of the specified components of the defined composition sums to less than 100 weight-percent and a remainder of the formulation comprises other components, wherein the total amount of the specified components of the defined composition and the remainder sums to 100 weight-percent. The elastomer formulations disclosed herein sum to 100 weight-percent of the total amount of specified components and other components.

The chemical structures described herein are named according to IUPAC nomenclature rules and include art-accepted common names and abbreviations where appropriate. The IUPAC nomenclature can be derived with chemical structure drawing software programs, such as ChemDraw® (PerkinElmer, Inc.), ChemDoodle® (iChemLabs, LLC) and Marvin (ChemAxon Ltd.). The chemical structure controls in the disclosure to the extent that an IUPAC name is misnamed or otherwise conflicts with the chemical structure disclosed herein.

Modified Silicon Resins

New modified silicone resins and methods for their preparation and application are disclosed that provide unexpectedly superior thermal resistance and long-life operating characteristics as elastomers at high temperatures (e.g., 316° C.). The resins incorporate benzene, phosphorous or other species into silicone backbones or side chains and produce modified silicone resins. The resins can be used to prepare elastomer formulations having improved thermal resistance for high temperature (for example, greater than 316° C.) applications.

As detailed below, the new modified silicone resins offer numerous advantages over prior art silicone-based polymers used in high-temperature elastomeric resin applications. First, the resins have demonstrable improved thermal performance. Second, tunable resins can be produced with controlled and desired molecular weights or viscosities, thereby enabling their use in formulations with other components. Third, α,ω-hydroxyl-terminated groups can be generated as the terminal groups of siloxane resins so that they can be readily polymerized by common curing technologies (e.g., condensation curing using dibutyltin dilaurate, dibutltin octoate, etc.). Fourth, different reactions with diverse structural choices can be used to produce various types of silicone modifications and material formulations. Fifth, the disclosed resins remove thermally weak fragments, demonstrating the unexpectedly superior robust mechanical and thermal properties. These and other features of the new modified silicone resins and the methods directed thereto are more fully described below.

In a first aspect, a modified silicone resin of Formula (I) is described:

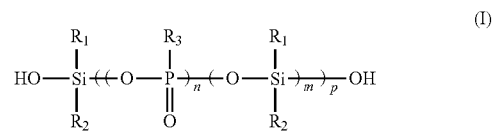

(I)

wherein $R^1$, $R^2$, and $R^3$ are each independently selected from a group consisting of H, alkyl, alkenyl, alkynyl, and aryl;

n ranges from 1 to 10;

m ranges from 1 to 200; and p ranges from 2 to 1,000.

In some aspects, a modified silicone resin of Formula (I) includes narrower ranges for n, m and p than provided above, wherein n ranges from 1 to 3; m ranges from 1 to 100; and p ranges from 10 to 500.

In certain aspects, a modified silicone resin of Formula (I) is described, wherein $R^1$, $R^2$, and $R^3$ each being independently selected from a group consisting of H, $C_{1-8}$ alkyl, $C_{2-8}$ alkenyl, $C_{2-8}$ alkynyl, and aryl. In certain aspects, a modified silicone resin of Formula (I) wherein $R^1$, $R^2$, and $R^3$ each being independently selected from a group consisting of methyl, ethyl, propyl, butyl, ethylenyl, propylenyl, butylenyl, acetylenyl, diacetylenyl, and aryl. In certain aspects, a modified silicone resin of Formula (I) specify $R^1$, $R^2$, and $R^3$ each being independently selected from a group consisting of methyl and phenyl. In each of the foregoing aspects, the modified silicone resin include narrow ranges for n, m and p, wherein n ranges from 1 to 3; m ranges from 1 to 100; and p ranges from 10 to 500.

In one aspect, a modified silicone resin of Formula (I) is provided, wherein values for n, m and p to provide a compound of Formula (I) having a viscosity ranging from about 500 cSt to about 10,000 cSt.

In one aspect, a modified silicone resin of Formula (I) is provided, wherein a ratio of n to m ranges from about 1:1 to about 1:200.

In another aspect, a modified silicone resin of Formula (I) is provided, wherein n ranges from 1 to 5; m ranges from 1 to 100; and p ranges from 2 to 500. In another aspect, a modified silicone resin of Formula (I) is provided, wherein n ranges from 1 to 3; m ranges from 5 to 10; and p ranges from 2 to 100. In another aspect, a modified silicone resin of Formula (I) is provided, wherein n ranges from 1 to 10; m ranges from 5 to 100; and p ranges from 10 to 500.

Examples of modified silicone resins of Formula (I) are listed in Table I; wherein values for n, m, and p are as described above.

TABLE 1

Exemplary Resins of Formula (I)

(i) HO—Si—((O—P)ₙ—(O—Si)ₘ)ₚ—OH

TABLE 1-continued

Exemplary Resins of Formula (I)

(ii)

HO—Si—((O—P)ₙ—(O—Si)ₘ)ₚ—OH
     |                        |
     (phenyl on top Si,        (phenyl on Si)
      P=O)

(iii)

HO—Si—((O—P)ₙ—(O—Si)ₘ)ₚ—OH
(two phenyl groups)

(iv)

HO—Si—((O—P)ₙ—(O—Si)ₘ)ₚ—OH
(phenyl groups below)

(v)

HO—Si—((O—P)ₙ—(O—Si)ₘ)ₚ—OH
(three phenyl groups)

(vii)

HO—Si—((O—P)ₙ—(O—Si)ₘ)ₚ—OH
(phenyl and vinyl)

(viii)

HO—Si—((O—P)ₙ—(O—Si)ₘ)ₚ—OH
(vinyl groups)

In another aspect, a modified silicone resin of Formula (II) having one of compositions (a)-(c) is described:

(a) a composition of Formula (II) comprising at least one of each of the following subunits:

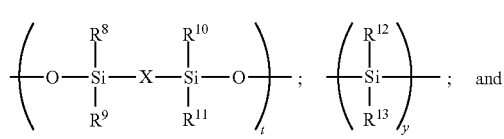

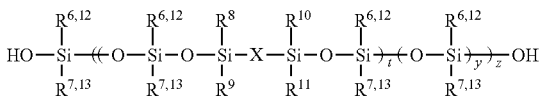

(b) a composition of Formula (II) comprising:

$$\text{HO—Si}\underset{R^{7,13}}{\overset{R^{6,12}}{|}}\text{—(O—Si}\underset{R^{7,13}}{\overset{R^{6,12}}{|}}\text{—O—Si}\underset{R^9}{\overset{R^8}{|}}\text{—X—Si}\underset{R^{11}}{\overset{R^{10}}{|}}\text{—O—Si}\underset{R^{7,13}}{\overset{R^{6,12}}{|}}\text{)ₜ—(O—Si}\underset{R^{7,13}}{\overset{R^{6,12}}{|}}\text{)ᵧ—OH}$$
(II)

or (c) a composition of Formula (II) made by a process comprising: contacting

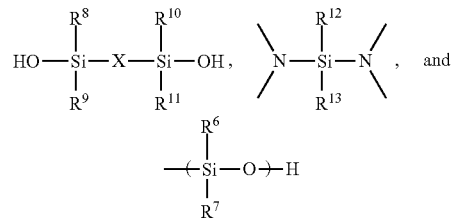

in presence of an organic solvent;

wherein $R^6$, $R^7$, $R^8$, $R^9$, $R^{10}$, $R^{11}$, $R^{12}$ and $R^{13}$ are each independently selected from a group consisting of H, alkyl, alkenyl, alkynyl, and aryl; X is selected from a group consisting of arylene, transition metal, inorganic oxide, and silsesquioxane; and t ranges from 1 to 10; y ranges from 1 to 200; and z ranges from 1 to 1,000 for compositions (a) or (b) of Formula (II).

In another aspect, a modified silicone resin of Formula (II) is described, wherein $R^6$, $R^7$, $R^8$, $R^9$, $R^{10}$, $R^{11}$, $R^{12}$, and $R^{13}$ are each independently selected from a group consisting of H, $C_{1-8}$ alkyl, $C_{2-8}$ alkenyl, $C_{2-8}$ alkynyl, and aryl. In another aspect, a modified silicone resin of Formula (II) is described, wherein, $R^6$, $R^7$, $R^8$, $R^9$, $R^{10}$, $R^{11}$, $R^{12}$, and $R^{13}$ are each independently selected from a group consisting of methyl, ethyl, propyl, butyl, ethylenyl, propylenyl, butylenyl, acetylenyl, diacetylenyl and aryl. In another aspect, a modified silicone resin of Formula (II) is described, wherein $R^6$, $R^7$, $R^8$, $R^9$, $R^{10}$, and $R^{11}$ are each independently selected from a group consisting of methyl and phenyl; and $R^{12}$ and $R^{13}$ are each independently selected from a group consisting of methyl, ethyl, propyl, butyl, ethylenyl, propylenyl, butylenyl, acetylenyl, diacetylenyl, and aryl.

In another aspect, a modified silicone resin of Formula (II) is described, wherein t ranges from 1 to 3; y ranges from 5 to 10; and z ranges from 1 to 100.

In another aspect, a modified silicone resin of Formula (II) is described, wherein ratio of t to y ranges from about 1:1 to about 1:200.

Exemplary substituents X of Formula (II) for arylenes, transition metals, inorganic oxides, and silsesquioxanes are illustrated below in Table II.

TABLE II
Exemplary substituents X of Formula (II).
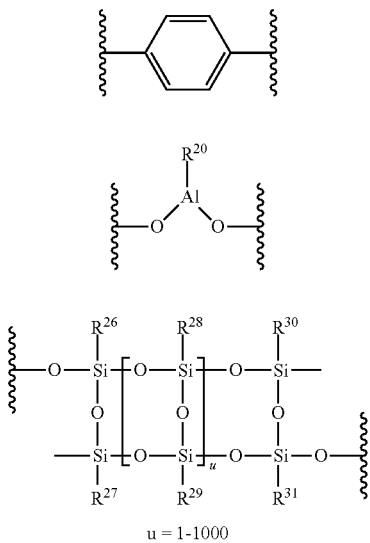
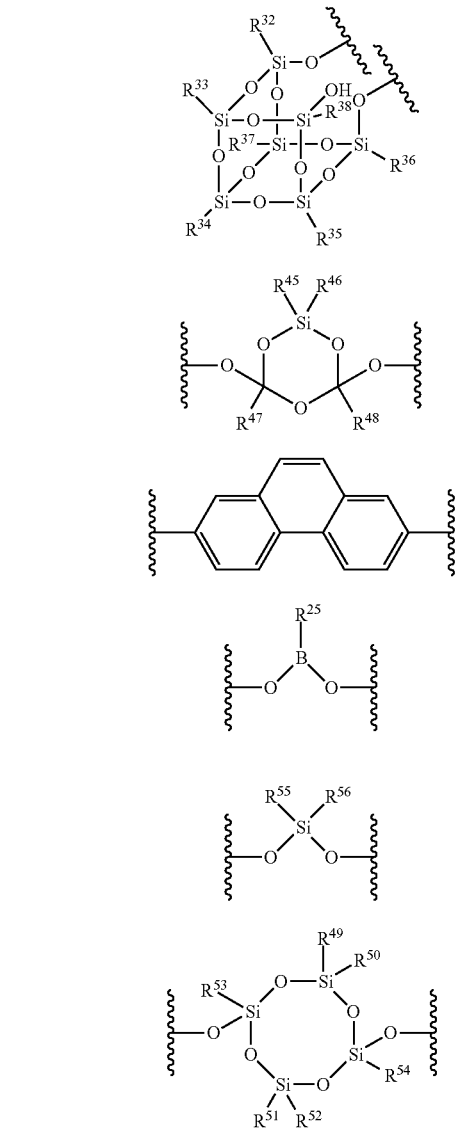
Accordingly, exemplary modified silicone resins of Formula (II) are listed in Table III:
TABLE III
Exemplary Modified Silicone Resins of Formula (II).
| Resin | X | $R^{6-13a}$ | $R^\#$ |
|---|---|---|---|
| (1) | (structure with $R^{55}$, $R^{56}$ on Si, bonded via O) | $CH_3$ | $R^{55-56}$ = $CH_3$ |
| (2) | (structure with $R^{55}$, $R^{56}$ on Si, bonded via O) | $CH_3$ | $R^{55-56}$ = Phenyl |

TABLE III-continued

Exemplary Modified Silicone Resins of Formula (II).

| Resin | X | $R^{6-13a}$ | $R^\#$ |
|---|---|---|---|
| (3) | [p-phenylene] | CH$_3$ | |
| (4) | [p-phenylene] | $R^{8-11}$ = CH$_3$, $R^{6,7,12,13}$ = CH$_3$, Vinyl | |
| (5) | [p-phenylene] | $R^{8-11}$ = CH$_3$, $R^{6,7,12,13}$ = CH$_3$, Vinyl, Phenyl | |
| (9) | Zr(O–)(O–) with $R^{23}$, $R^{24}$ | CH$_3$ | $R^{23}$, $R^{24}$ = OPr |
| (10) | Ti(O–)(O–) with $R^{21}$, $R^{22}$ | CH$_3$ | $R^{21}$, $R^{22}$ = OBu |
| (11) | B(O–)(O–) with $R^{25}$ | CH$_3$ | $R^{25}$ = Phenyl |
| (12) | POSS cage with $R^{32-38}$, OH | CH$_3$ | $R^{32-38}$ = CH$_3$ |
| (13) | POSS cage with $R^{32-38}$, OH | CH$_3$ | $R^{32-38}$ = Phenyl |
| (14) | cyclic siloxane with $R^{45-48}$ | CH$_3$ | $R^{45-48}$ = CH$_3$ |
| (15) | cyclic siloxane with $R^{49-54}$ | CH$_3$ | $R^{49-54}$ = CH$_3$ |

$^a$Where more than one substituent is identified in Table III for $R^{6-13}$ (that is, for Resins #4 and #5), each of $R^{6-13}$ may be independently selected from those substitutents.

Modified silicone resins of Formula (I) and/or Formula (II) can be characterized for their molecular structure/composition by UV-Visible spectroscopy (UV-Vis), Infrared spectroscopy (IR), nuclear magnetic resonance spectroscopy (NMR), and elemental analysis; for their molecular weight by gel permeation chromatography (GPC), and for their viscosity by viscometer or rheometer.

A modified silicone resin, as used herein, denotes a resin where at least one member of the resin backbone or side chains is replaced with a phosphorous group (as in Formula (I)) or an "X" moiety (as in Formula (II)). Without the claimed subject matter being bound by any particular theory, these structural units are expected to disrupt the degradation mechanism of siloxane materials at high temperatures.

Elastomer Formulations Comprising Modified Silicon Resin(s)

In another aspect, an elastomer formulation comprises at least one modified silicone resin of Formula (I):

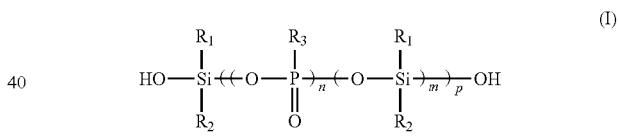

(I)

wherein $R^1$, $R^2$, and $R^3$ are each independently selected from a group consisting of H, alkyl, alkenyl, alkynyl, and aryl;
n ranges from 1 to 10;
m ranges from 1 to 200; and
p ranges from 2 to 1,000;
optionally, at least one silicate;
optionally, at least one silica;
at least one metal oxide; and
at least one curing agent.

In one aspect of an elastomer formulation comprising at least one modified silicone resin of Formula (I), m ranges from 1 to 100; and p ranges from 10 to 500.

In one aspect of an elastomer formulation comprising at least one modified silicone resin of Formula (I), $R^1$, $R^2$, and $R^3$ are each independently selected from a group consisting of H, C$_{1-8}$ alkyl, C$_{2-8}$ alkenyl, C$_{2-8}$ alkynyl, and aryl. In one aspect of an elastomer formulation comprising at least one modified silicone resin of Formula (I), $R^1$, $R^2$, and $R^3$ are each independently selected from a group consisting of methyl, ethyl, propyl, butyl, ethylenyl, propylenyl, butylenyl, acetylenyl, diacetylenyl, and aryl. In one aspect of an elastomer formulation comprising at least one modified silicone resin of Formula (I), $R^1$, $R^2$, and $R^3$ are each independently selected from a group consisting of methyl and phenyl. In these foregoing aspects, m ranges from 1 to 100; and p ranges from 10 to 500.

In one aspect of an elastomer formulation comprising at least one modified silicone resin of Formula (I), wherein n ranges from 1 to 10, m ranges from 1 to 100, and p ranges from 10 to 500, the at least one modified silicone resin comprises at least one of the species selected from Table I.

In one aspect of an elastomer formulation comprising at least one modified silicone resin of Formula (I), the at least one metal oxide comprises at least one of iron oxide (for example, FeO, $Fe_2O_3$ and $Fe_3O_4$), titanium oxide (for example, $TiO_2$), cerium oxide (for example, $CeO_2$), zinc oxide (for example, ZnO), and zirconium oxide (for example, $ZrO_2$). In one aspect, the at least one metal oxide comprises at least one of iron oxide (for example, FeO, $Fe_2O_3$ and $Fe_3O_4$), and titanium oxide (for example, $TiO_2$).

In one aspect of an elastomer formulation comprising at least one modified silicone resin of Formula (I), values for n, m and p provide a compound of Formula (I) having a viscosity ranging from about 500 cSt to about 10,000 cSt.

In one aspect of an elastomer formulation comprising at least one modified silicone resin of Formula (I), a ratio of n to m ranges from about 1:1 to about 1:200.

In one aspect of an elastomer formulation comprising at least one modified silicone resin of Formula (I), the at least one modified silicone resin of Formula (I) is present in an amount ranging from about 5 weight-percent to about 95 weight-percent; the at least one metal oxide is present in an amount ranging from about 2 weight-percent to about 80 weight-percent; and the at least one curing agent is present in an amount ranging from about 0.10 weight-percent to about 10 weight-percent.

In another aspect, an elastomer formulation comprising a modified silicone resin of Formula (I) is provided, wherein n ranges from 1 to 5, m ranges from 1 to 100, and p ranges from 2 to 500. In another aspect, the elastomer formulation comprises a modified silicone resin of Formula (I), wherein n ranges from 1 to 3; m ranges from 5 to 10; and p ranges from 10 to 500.

In another aspect, an elastomer formulation comprising a modified silicone resin of Formula (I) is provided, wherein the at least one metal oxide can have a particle diameter size ranging from, for example, about 1 nanometer to about 5 micrometers, from about 25 nanometers to about 2 micrometers, and/or from about 50 nanometers to about 500 nanometers.

In another aspect, an elastomer formulation comprising a modified silicone resin of Formula (I) is provided, wherein the at least one silicate is at least one of ethyl silicate, methyl silicate, isopropyl silicate, or butyl silicate.

In another aspect, an elastomer formulation comprising a modified silicone resin of Formula (I) is provided, wherein the at least one silica can be fumed silica, functionalized silica, among others.

In another aspect, an elastomer formulation comprising a modified silicone resin of Formula (I) is provided, wherein the modified silicone resin is selected from Table I.

In another aspect, an elastomer formulation comprising a modified silicone resin of Formula (I) is provided, wherein values for n, m and p provide a compound of Formula (I) comprising a viscosity ranging from about 500 cSt to about 10,000 cSt.

In another aspect, the elastomer formulation comprises a modified silicone resin of Formula (I), wherein ratio of n to m ranges from about 1:1 to about 1:200.

In another aspect, elastomer formulations comprising the following compositions are provided: (a) the compound of Formula (I) present in an amount ranging from about 5 weight-percent to about 95 weight-percent; (b) at least one metal oxide present in an amount ranging from about 2 weight-percent to about 80 weight-percent; (c) optionally at least one silicate present in an amount ranging from about 0 weight-percent to about 25 weight-percent; (d) optionally at least one silica present in an amount ranging from about 0 weight-percent to about 20 weight-percent; (e) at least one curing agent present in an amount ranging from about 0.10 weight-percent to about 10 weight-percent.

In another aspect, an elastomer formulation comprising at least one modified silicone resin of Formula (II) having one of compositions (a)-(c) is described:

(a) a composition of Formula (II) comprising at least one of each of the following subunits:

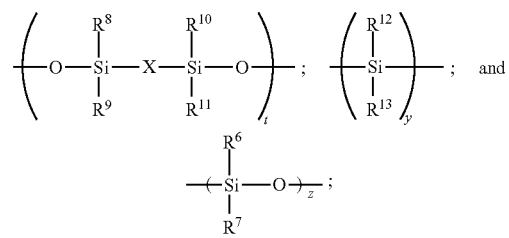

(b) a composition of Formula (II) comprising:

(II)

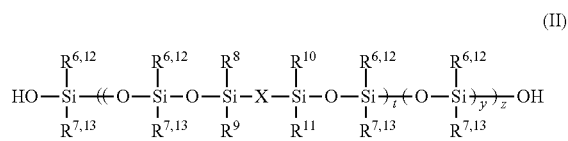

or (c) a composition of Formula (II) made by a process comprising: contacting

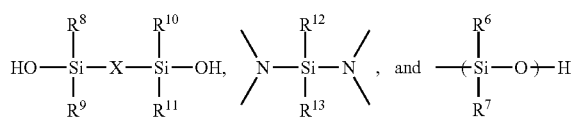

in presence of an organic solvent;
wherein $R^6$, $R^7$, $R^8$, $R^9$, $R^{10}$, $R^{11}$, $R^{12}$ and $R^{13}$ are each independently selected from a group consisting of H, alkyl, alkenyl, alkynyl, and aryl; X is selected from a group consisting of arylene, transition metal, inorganic oxide, and silsesquioxane; and t ranges from 1 to 10; y ranges from 1 to 200; and z ranges from 1 to 1,000 for compositions (a) or (b) of Formula (II); optionally, at least one silicate;
optionally, at least one silica;
at least one metal oxide; and
at least one curing agent.

In another aspect, an elastomer formulation comprising a modified silicone resin of Formula (II) is provided, wherein $R^6$, $R^7$, $R^8$, $R^9$, $R^{10}$, $R^{11}$, $R^{12}$, and $R^{13}$ are each independently selected from a group consisting of H, $C_{1-8}$ alkyl, $C_{2-8}$ alkenyl, $C_{2-8}$ alkynyl, and aryl. In another aspect, an elastomer formulation comprising a modified silicone resin of Formula (II) is provided, wherein $R^6$, $R^7$, $R^8$, $R^9$, $R^{10}$, $R^{11}$, $R^{12}$, and $R^{13}$ are each independently selected from a group consisting of methyl, ethyl, propyl, butyl, ethylenyl, propylenyl, butylenyl, acetylenyl, diacetylenyl and aryl. In another aspect, an elastomer formulation comprising a modified silicone resin of Formula (II) is provided, wherein $R^6$, $R^7$, $R^8$, $R^9$, $R^{10}$, and $R^{11}$ are each independently selected from a group consisting of methyl and phenyl; and $R^{12}$ and $R^{13}$ are each independently selected from a group consisting of methyl, ethyl, propyl, butyl, ethylenyl, propylenyl, butylenyl, acetylenyl, diacetylenyl, and aryl.

In another aspect, an elastomer formulation comprising a modified silicone resin of Formula (II) is provided, wherein t ranges from 1 to 5; y ranges from 1 to 100; and z ranges from 1 to 1000. In another aspect, an elastomer formulation comprising a modified silicone resin of Formula (II) is provided, wherein t ranges from 1 to 3; y ranges from 5 to 100; and z ranges from 10 to 500.

In another aspect, an elastomer formulation comprising a modified silicone resin of Formula (II) is provided, wherein the at least one metal oxide can be selected from, for example, at least one of iron oxide (for example, FeO, $Fe_2O_3$ and $Fe_3O_4$), titanium oxide (for example, $TiO_2$), cerium oxide (for example, $CeO_2$), zinc oxide (for example, ZnO), and zirconium oxide (for example, $ZrO_2$). In another aspect, an elastomer formulation comprising a modified silicone resin of Formula (II) is provided, wherein the at least one metal oxide is selected from at least one of iron oxide (for example, FeO, $Fe_2O_3$ and $Fe_3O_4$), and titanium oxide (for example, $TiO_2$).

In another aspect, an elastomer formulation comprising a modified silicone resin of Formula (II) is provided, wherein the at least one metal oxide can have a particle diameter size ranging from, for example, about 1 nanometer to about 5 micrometers, from about 25 nanometers to about 2 micrometers, and/or from about 50 nanometers to about 500 nanometers.

In another aspect, an elastomer formulation comprising a modified silicone resin of Formula (II) is provided, wherein the optional at least one silicate is at least one of ethyl silicate, methyl silicate, isopropyl silicate, or butyl silicate.

In another aspect, an elastomer formulation comprising a modified silicone resin of Formula (II) is provided, wherein the optional at least one silica can be fumed silica, functionalized silica, among others.

In another aspect, an elastomer formulation comprising a modified silicone resin of Formula (II) is provided, wherein the modified silicone resin is selected from Table III.

In another aspect, an elastomer formulation comprising a modified silicone resin of Formula (II) is provided, wherein values for t, y and z provide a compound of Formula (II) comprising a viscosity ranging from about 500 cSt to about 10,000 cSt.

In another aspect, an elastomer formulation comprising a modified silicone resin of Formula (II) is provided, wherein ratio of n to m ranges from about 1:1 to about 1:200.

In another aspect, elastomer formulations comprising the following compositions are provided: (a) a modified silicone resin of Formula (II) present in an amount ranging from about 5 weight-percent to about 95 weight-percent; (b) at least one metal oxide present in an amount ranging from about 2 weight-percent to about 80 weight-percent; (c) optionally at least one silicate present in an amount ranging from about 0 weight-percent to about 25 weight-percent; (d) optionally at least one silica present in an amount ranging from about 0 weight-percent to about 20 weight-percent; (e) at least one curing agent present in an amount ranging from about 0.10 weight-percent to about 10 weight-percent.

In another aspect, an elastomer formulation comprising a modified silicone resin of Formula (II) is selected from Formulations #109, #110, and ##116-124:

| Formulation # | Starting Resin[2] (% w/w) | Starting Resin[2] (% w/w) | Iron oxide[3] (% w/w) | Curing agent[4] (% w/w) |
|---|---|---|---|---|
| 109 | 50[1] (Resin (2)) | | 45 | 5 (b) |
| 110 | 59 (Resin (2)) | | 36 | 5 (b) |
| 116 | 24.7 (Resin (1)) | 24.7 (Resin (1)) | 43 ($TiO_2$) | 7.6 (c) |
| 117 | 25.5 (Resin (1)) | 25.5 (Resin (1)) | 43 | 6 (c) |
| 118 | 49.5 (Resin (1)) | | 42.5 | 0.5 (a), 7.5 (c) |
| 119 | 62.95 (Resin (1)) | | 34.55 | 2.5 (c) |
| 120 | 73.5 (Resin (1)) | | 25 | 1.5 (b) |
| 121 | 32.25 (Resin (1)) | 32.25 (Resin (1)) | 33 | 2.5 (b) |
| 122 | 32 (Resin (1)) | 32 (Resin (1)) | 33 ($TiO_2$) | 3 (b) |
| 123 | 29 (Resin (1)) | 29 (Resin (1)) | 27, 12 ($TiO_2$) | 3 (c) |
| 124 | 61 (Resin (2)) | | 24, 12 ($TiO_2$) | 3 (b) |

[1]Numerical values represent weight-percent contribution of component to elastomer formulation.
[2]Starting resin(s) correspond to those resins having the structure presented in Table III.
[3]Iron oxide at the weight-percent contribution in the elastomer formulation is presented. When $TiO_2$ replaces the iron oxide in the elastomer formulation, then only the weight-percent contribution of $TiO_2$ is presented (e.g., Formulations 116 and 122). When $TiO_2$ supplements the iron oxide in the elastomer formulation, then the first weight-percent contribution reflects that of iron oxide and the second weight-percent contribution reflects that of $TiO_2$ (e.g., Formulations 123 and 124).
[4]Curing agents: a - dibutyltin dilaurate; b - tris(dimethylamino)methylsilane; c - ethyltriacetoxysilane In another aspect, an elastomer formulation comprising a modified silicone resin of Formula (II) is described, further comprising at least one silicate. The at least one silicate comprises at least one of ethyl silicate, methyl silicate, isopropyl silicate and butyl silicate. In these aspects, $R^6$, $R^7$, $R^8$, $R^9$, $R^{10}$, $R^{11}$, $R^{12}$, and $R^{13}$ of Formula (II) are each independently selected from a first group consisting of H, alkyl, alkenyl, alkynyl, and aryl; a second group consisting of H, $C_{1-8}$ alkyl, $C_{2-8}$ alkenyl, $C_{2-8}$ alkynyl, and aryl; a third group consisting of methyl, ethyl, propyl, butyl, ethylenyl, propylenyl, butylenyl, acetylenyl, diacetylenyl and aryl; and a fourth group consisting methyl and phenyl. In these aspects, an elastomer formulation comprising a modified silicone resin of Formula (II) and at least one silicate is provided, wherein $R^6$, $R^7$, $R^8$, $R^9$, $R^{10}$, and $R^{11}$ are each independently selected from a group consisting of methyl and phenyl; and $R^{12}$ and $R^{13}$ are each independently selected from a group consisting of methyl, ethyl, propyl, butyl, ethylenyl, propylenyl, butylenyl, acetylenyl, diacetylenyl, and aryl.

In another aspect, an elastomer formulation comprising a modified silicone resin of Formula (II) having $R^6$, $R^7$, $R^8$, $R^9$, $R^{10}$, $R^{11}$, $R^{12}$, and $R^{13}$ each being independently selected from a group consisting of methyl and phenyl and further comprising at least one silicate are provided, wherein the at least one modified silicone resin of Formula (II) is present in an amount ranging from about 5 weight-percent to about 95 weight-percent; the at least one metal oxide is present in an amount ranging from about 2 weight-percent to about 80 weight-percent; the at least one silicate is present in an amount ranging from 0 weight-percent to about 25 weight-percent; the at least one silica present in an amount ranging from about 0 weight-percent to about 20 weight-percent; and the at least one curing agent is present in an amount ranging from about 0.10 weight-percent to about 10 weight-percent.

In another aspect, an elastomer formulation comprising a modified silicone resin of Formula (II) is selected from Formulations #102, #106, #107, ##112-114, #125 and #126:

| Formulation # | Starting Resin[2] (% w/w) | Iron oxide[3] (% w/w) | Ethyl silicate[4] (% w/w) | Curing agent[5] (% w/w) |
|---|---|---|---|---|
| 102 | 52 (Resin (2)) | 45 | 2.5 | 0.5 |
| 106 | 49.5 (Resin (2)) | 45 | 5 | 0.5 |
| 107 | 50.5 (Resin (2)) | 45 | 4 | 0.5 |
| 112 | 52.5 (Resin (1)) | 45 | 2 | 0.5 |
| 113 | 49.5 (Resin (1)) | 45 | 5 | 0.5 |
| 114 | 52 (Resin (1)) | 45 | 2.5 | 0.5 |
| 125 | 58.5 (Resin (2)) | 36 ($TiO_2$) | 5 | 0.5 |
| 126 | 58.5 (Resin (2)) | 24, 12 ($TiO_2$) | 5 | 0.5 |

[1]Numerical values represent weight-percent contribution of component to elastomer formulation.
[2]Starting resin(s) correspond to those resins having the structure presented in Table III.
[3]Iron oxide at the weight-percent contribution in the elastomer formulation is presented. When $TiO_2$ replaces the iron oxide in the elastomer formulation, then only the weight-percent contribution of $TiO_2$ presented (e.g., Formulation 125). When $TiO_2$ supplements the iron oxide in the elastomer formulation, then the first weight-percent contribution reflects that of iron oxide and the second weight-percent contribution reflects that of $TiO_2$ (e.g., Formulation 126).
[4]Ethyl silicate at the weight-percent contribution in the elastomer formulation is presented.
[5]Dibutyltin dilaurate In another aspect, an elastomer formulation comprising a modified silicone resin of Formula (II) is described, further comprising at least one silica. In some aspects, the at least one silica comprises at least one of fumed silica and functionalized silica. In these aspects, $R^6$, $R^7$, $R^8$, $R^9$, $R^{10}$, $R^{11}$, $R^{12}$, and $R^{13}$ of Formula (II) are each independently selected from a first group consisting of H, alkyl, alkenyl, alkynyl, and aryl; a second group consisting of H, $C_{1-8}$ alkyl, $C_{2-8}$ alkenyl, $C_{2-8}$ alkynyl, and aryl; a third group consisting of methyl, ethyl, propyl, butyl, ethylenyl, propylenyl, butylenyl, acetylenyl, diacetylenyl and aryl; and a fourth group consisting methyl and phenyl. In these aspects, an elastomer formulation comprising a modified silicone resin of Formula (II) and at least one silicate is provided, wherein $R^6$, $R^7$, $R^8$, $R^9$, $R^{10}$, and $R^{11}$ are each independently selected from a group consisting of methyl and phenyl; and $R^{12}$ and $R^{13}$ are each independently selected from a group consisting of methyl, ethyl, propyl, butyl, ethylenyl, propylenyl, butylenyl, acetylenyl, diacetylenyl, and aryl.

In another aspect, an elastomer formulation comprising a modified silicone resin of Formula (II) having $R^6$, $R^7$, $R^8$, $R^9$, $R^{10}$, $R^{11}$, $R^{12}$, and $R^{13}$ each being independently selected from a group consisting of methyl and phenyl, and further comprising at least one silica selected from least one of fumed silica and functionalized silica is provided, wherein the at least one modified silicone resin of Formula (II) is present in an amount ranging from about 5 weight-percent to about 95 weight-percent; the at least one metal oxide is present in an amount ranging from about 2 weight-percent to about 80 weight-percent; the at least one silica is present in an amount ranging from 0 weight-percent to about 20 weight-percent; and the at least one curing agent is present in an amount ranging from about 0.10 weight-percent to about 10 weight-percent.

In another aspect, an elastomer formulation comprising a modified silicone resin of Formula (II) is described, wherein $R^6$, $R^7$, $R^8$, $R^9$, $R^{10}$, $R^{11}$, $R^{12}$, and $R^{13}$ are each independently selected from a group consisting of methyl and phenyl, and wherein the elastomer formulation further comprises at least one silicate and at least one silica.

In another aspect, an elastomer formulation comprising a modified silicone resin of Formula (II) is described, wherein $R^6$, $R^7$, $R^8$, $R^9$, $R^{10}$, $R^{11}$, $R^{12}$, and $R^{13}$ are each independently selected from a group consisting of methyl and phenyl, and further comprising at least one silicate and at least one silica, wherein the at least one silicate comprises at least one of ethyl silicate, methyl silicate, isopropyl silicate and butyl silicate and the at least one silica comprises at least one of fumed silica and functionalized silica.

In another aspect, an elastomer formulation comprising a modified silicone resin of Formula (II) is described, wherein $R^6$, $R^7$, $R^8$, $R^9$, $R^{10}$, $R^{11}$, $R^{12}$, and $R^{13}$ are each independently selected from a group consisting of methyl and phenyl, and further comprising at least one silicate comprising at least one of ethyl silicate, methyl silicate, isopropyl silicate and butyl silicate and at least one silica comprising at least one of fumed silica and functionalized silica, wherein the at least one modified silicone resin of Formula (II) is present in an amount ranging from about 5 weight-percent to about 95 weight-percent; the at least one metal oxide is present in an amount ranging from about 2 weight-percent to about 80 weight-percent; the at least one silicate is present in an amount ranging from 0 weight-percent to about 25 weight-percent; the at least one silica is present in an amount ranging from 0 weight-percent to about 20 weight-percent; and the at least one curing agent is present in an amount ranging from about 0.10 weight-percent to about 10 weight-percent.

In another aspect, an elastomer formulation comprises at least one modified silicone resin of Formula (I):

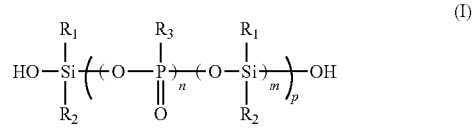

and at least one modified silicone resin of Formula (II) having one of compositions (a)-(c):

(a) a composition of Formula (II) comprising at least one of each of the following subunits:

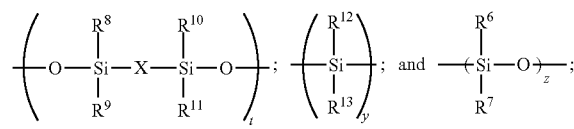

(b) a composition of Formula (II) comprising:

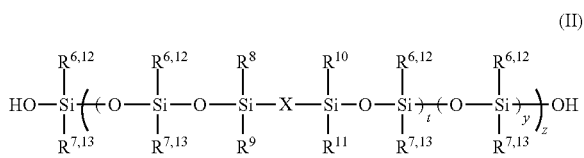

or (c) a composition of Formula (II) made by a process comprising: contacting

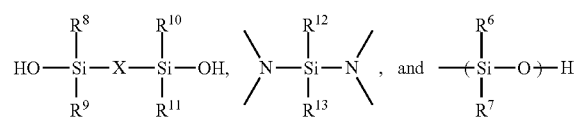

in presence of an organic solvent;
wherein $R^1$, $R^2$, $R^3$, $R^6$, $R^7$, $R^8$, $R^9$, $R^{10}$, $R^{11}$, $R^{12}$ and $R^{13}$ are each independently selected from a group consisting of H, alkyl, alkenyl, alkynyl, and aryl; X is selected from a group consisting of arylene, transition metal, inorganic oxide, and silsesquioxane; and t ranges from 1 to 10; y ranges from 1 to 200; and z ranges from 1 to 1,000 for compositions (a) or (b) of Formula (II).
optionally, at least one silicate;
optionally, at least one silica;
at least one metal oxide; and
at least one curing agent.

In another aspect, an elastomer formulation comprising a modified silicone resin of Formula (I) and Formula (II) is provided, wherein $R^1$, $R^2$, $R^3$, $R^6$, $R^7$, $R^8$, $R^9$, $R^{10}$, $R^{11}$, $R^{12}$ and $R^{13}$ are each independently selected from a group consisting of methyl, ethyl, propyl, butyl, ethylenyl, propylenyl, butylenyl, acetylenyl, diacetylenyl and aryl.

In another aspect, an elastomer formulation comprising a modified silicone resin of Formula (I) and Formula (II) is provided, wherein $R^1$, $R^2$, $R^3$, $R^6$, $R^7$, $R^8$, $R^9$, $R^{10}$, and $R^{11}$ are each independently selected from a group consisting of methyl and phenyl; and $R^{12}$ and $R^{13}$ are each independently selected from a group consisting of methyl, ethyl, propyl, butyl, ethylenyl, propylenyl, butylenyl, acetylenyl, diacetylenyl, and aryl.

In another aspect, an elastomer formulation comprising a modified silicone resin of Formula (I) and Formula (II) is provided, wherein n ranges from 1 to 5; m ranges from 1 to 200; p ranges from 2 to 1000; and wherein t ranges from 1 to 5; y ranges from 1 to 200; and z ranges from 2 to 1000. In another aspect, an elastomer formulation comprising a modified silicone resin of Formula (I) and Formula (II) is provided, wherein n ranges from 1 to 3; m ranges from 1 to 100; and p ranges from 10 to 500; and wherein t ranges from 1 to 3; y ranges from 1 to 100; and z ranges from 10 to 500. In another aspect, an elastomer formulation comprising a modified silicone resin of Formula (I) and Formula (II) is provided, wherein n ranges from 1 to 3, m ranges from 5 to 100; and p ranges from 10 to 300, and wherein t ranges from 1 to 3; y ranges from 5 to 100; and z ranges from 10 to 300.

In another aspect, an elastomer formulation comprising a modified silicone resin of Formula (I) and Formula (II) is provided, wherein $R^1$, $R^2$, and $R^3$ are each independently selected from a group consisting of H, alkyl, alkenyl, alkynyl, and aryl and wherein $R^6$, $R^7$, $R^8$, $R^9$, $R^{10}$, $R^{11}$, $R^{12}$, and $R^{13}$ are each independently selected from a group consisting of H, $C_{1-8}$ alkyl, $C_{2-8}$ alkenyl, $C_{2-8}$ alkynyl, and aryl. In another aspect, an elastomer formulation comprising a modified silicone resin of Formula (I) and Formula (II) is provided, wherein $R^1$, $R^2$, and $R^3$ are each independently selected from a group consisting of H, alkyl, alkenyl, alkynyl, and aryl and wherein $R^6$, $R^7$, $R^8$, $R^9$, $R^{10}$, $R^{11}$, $R^{12}$, and $R^{13}$ are each independently selected from a group consisting of methyl, ethyl, propyl, butyl, ethylenyl, propylenyl, butylenyl, acetylenyl, diacetylenyl, and aryl. In another aspect, an elastomer formulation comprising a modified silicone resin of Formula (I) and Formula (II) is provided, wherein $R^1$, $R^2$, and $R^3$ are each independently selected from a group consisting of H, alkyl, alkenyl, alkynyl, and aryl and wherein $R^6$, $R^7$, $R^8$, $R^9$, $R^{10}$, $R^{11}$, $R^{12}$, and $R^{13}$ are each independently selected from a group consisting of methyl and phenyl.

In another aspect, an elastomer formulation comprising a modified silicone resin of Formula (I) and Formula (II) is provided, wherein $R^1$, $R^2$, $R^3$, $R^6$, $R^7$, $R^8$, $R^9$, $R^{10}$, $R^{11}$, $R^{12}$, and $R^{13}$ are each independently selected from a first group consisting of H, $C_{1-8}$ alkyl, $C_{2-8}$ alkenyl, $C_{2-8}$ alkynyl, and aryl; a second group consisting of a third group consisting of methyl, ethyl, propyl, butyl, ethylenyl, propylenyl, butyle-nyl, acetylenyl, diacetylenyl and aryl; and a third group consisting methyl and phenyl. In those aspects where both Formula (I) and Formula (II) is provided, wherein $R^1$, $R^2$, $R^3$, $R^6$, $R^7$, $R^8$, $R^9$, $R^{10}$, and $R^{11}$ are each independently selected from a group consisting of methyl and phenyl, $R^{12}$ and $R^{13}$ of Formula (II) are each independently selected from a group consisting of methyl, ethyl, propyl, butyl, ethylenyl, propylenyl, butylenyl, acetylenyl, diacetylenyl, and aryl.

In another aspect, an elastomer formulation comprises a modified silicone resin of Formula (I) and Formula (II) is provided, wherein the at least one modified silicone resin of Formula (I) is present in an amount ranging from about 5 weight-percent to about 95 weight-percent; the at least one metal oxide is present in an amount ranging from about 2 weight-percent to about 80 weight-percent; and the at least one curing agent is present in an amount ranging from about 0.10 weight-percent to about 10 weight-percent.

In another aspect, an elastomer formulation comprising a modified silicone resin of Formula (I) and Formula (II) is provided, wherein the elastomer formulation is Formulation #108 or #111:

| Formulation # | Formula (I) (% w/w) | Formula (II) (% w/w) | Iron oxide (% w/w) | Curing agent[1] (% w/w) |
|---|---|---|---|---|
| 108 | 6 [Resin (i)] | 49.5 [Resin (#2)] | 44 | 0.5 (a) |
| 111 | 5 [Resin (i)] | 47 [Resin (#2)] | 44 | 4 (b) |

[1]Curing agents: a - dibutyltin dilaurate; b - tris(dimethylamino)methylsilane

In another aspect, the Elastomer Formulation #108 or #111 is provided, wherein the iron oxide comprises $Fe_2O_3$ having a particle size ranging from about 0.5 μm to about 5 μm, and the curing agent is at least one of dibutyltin dilaurate, tris(dimethylamino)methylsilane, and ethyltriacetoxysilane.

In another aspect, an elastomer formulation comprising a modified silicone resin of Formula (I) and Formula (II) is described, further comprising at least one silicate. In some aspects, the at least one silicate comprises at least one of ethyl silicate, methyl silicate, isopropyl silicate and butyl silicate. In these aspects, $R^1$, $R^2$, $R^3$ of Formula (I) and $R^6$, $R^7$, $R^8$, $R^9$, $R^{10}$, $R^{11}$, $R^{12}$, and $R^{13}$ of Formula (II) are each independently selected from a first group consisting of group consisting of H, alkyl, alkenyl, alkynyl, and aryl; a second group consisting of H, $C_{1-8}$ alkyl, $C_{2-8}$ alkenyl, $C_{2-8}$ alkynyl, and aryl; a third group consisting of methyl, ethyl, propyl, butyl, ethylenyl, propylenyl, butylenyl, acetylenyl, diacetylenyl and aryl; and a fourth group consisting methyl and phenyl. In these aspects, $R^1$, $R^2$, $R^3$ of Formula (I) are as described above for each of the respective first, second, third and fourth groups, and $R^6$, $R^7$, $R^8$, $R^9$, $R^{10}$, and $R^{11}$ of Formula (II) are each independently selected from a group consisting of methyl and phenyl; and $R^{12}$ and $R^{13}$ of Formula (II) are each independently selected from a group consisting of methyl, ethyl, propyl, butyl, ethylenyl, propylenyl, butylenyl, acetylenyl, diacetylenyl, and aryl.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl and further comprising at least one silicate, wherein the at least one modified silicone resin of Formula (I) is present in an amount ranging from about 5 weight-percent to about 95 weight-percent; the at least one metal oxide is present in an amount ranging from about 2 weight-percent to about 80 weight-percent; the at least one silicate is present in an amount ranging from 0 weight-percent to about 25 weight-percent; the at least one silica present in an amount ranging from about 0 weight-percent to about 20 weight-percent; and the at least one curing agent is present in an amount ranging from about 0.10 weight-percent to about 10 weight-percent.

In another aspect, an elastomer formulation comprising a modified silicone resin of Formula (I) and Formula (II) is selected from Formulation #104 or #105:

| Formulation # | Formula (I) (% w/w) | Formula (II) (% w/w) | Iron oxide (% w/w) | Ethyl Silicate (% w/w) | Curing agent[1] (% w/w) |
|---|---|---|---|---|---|
| 104 | 8 [Resin (ii)] | 45 [Resin (#2)] | 44 | 2.5 | 0.5 |
| 105 | 7 [(Resin (i)] | 46 [Resin (#2)] | 44 | 2.5 | 0.5 |

[1]Dibutyltin dilaurate

In another aspect, Elastomer Formulation #104 or #105 is provided, wherein the iron oxide comprises $Fe_2O_3$ having a particle size ranging from about 0.5 m to about 5 μm, and the curing agent is at least one of dibutyltin dilaurate, tris(dimethylamino)methylsilane; and ethyltriacetoxysilane, among others, as well as combinations thereof.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl, wherein the elastomer formulation further comprises at least one silica. In some aspects, the at least one silica comprises at least one of fumed silica and functionalized silica.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl and further comprising at least one silica selected from least one of fumed silica and functionalized silica, wherein the at least one modified silicone resin of Formula (I) is present in an amount ranging from about 5 weight-percent to about 95 weight-percent; the at least one metal oxide is present in an amount ranging from about 2 weight-percent to about 80 weight-percent; the at least one silicate is present in an amount ranging from 0 weight-percent to about 20 weight-percent; and the at least one curing agent is present in an amount ranging from about 0.10 weight-percent to about 10 weight-percent.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl, wherein the elastomer formulation further comprises at least one silicate and at least one silica.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl, and further comprising at least one silicate and at least one silica is provided, wherein the at least one silicate comprises at least one of ethyl silicate, methyl silicate, isopropyl silicate and butyl silicate and the at least one silica comprises at least one of fumed silica and functionalized silica.

In another aspect, an elastomer formulation comprising a modified silicone resin of Formula (I) and Formula (II) is described, wherein $R^1$, $R^2$, and $R^3$ are each independently selected from a group consisting of H, alkyl, alkenyl, alkynyl, and aryl, wherein $R^6$, $R^7$, $R^8$, $R^9$, $R^{10}$, $R^{11}$, $R^{12}$, and $R^{13}$ are each independently selected from a group consisting of methyl and phenyl, and further comprising at least one silicate comprising at least one of ethyl silicate, methyl silicate, isopropyl silicate and butyl silicate and further comprising at least one silica comprising at least one of fumed silica and functionalized silica is provided, wherein the at least one modified silicone resin of Formula (I) is present in an amount ranging from about 5 weight-percent to about 95 weight-percent; the at least one metal oxide is present in an amount ranging from about 2 weight-percent to about 80 weight-percent; the at least one silicate is present in an amount ranging from 0 weight-percent to about 25 weight-percent; the at least one silica is present in an amount ranging from 0 weight-percent to about 20 weight-percent; and the at least one curing agent is present in an amount ranging from about 0.10 weight-percent to about 10 weight-percent.

In another aspect, Elastomer Formulation #115 is described:

| Formulation # | Formula (I) (% w/w) | Formula (II) (% w/w) | Iron oxide (% w/w) | Ethyl Silicate (% w/w) | Curing agent[1] (% w/w) |
|---|---|---|---|---|---|
| 115 | 55.7 [Resin (i)] | 6.55 [Resin (#2)] | 27.11 | 1.96 (Ethyl silicate); 8.14 ($SiO_2$) | 0.54 |

[1]Dibutyltin dilaurate

In another aspect, Formulation #115 is provided, wherein the iron oxide comprises $Fe_2O_3$ having a particle size ranging from about 0.5 μm to about 5 μm, and the curing agent is at least one of dibutyltin dilaurate, tris(dimethylamino)methylsilane; and ethyltriacetoxysilane, among others, as well as combinations thereof.

In another aspect, an elastomer formulation comprising a modified silicone resin of Formula (I) and Formula (II) is provided, wherein the at least one metal oxide can be selected from, for example, at least one of iron oxide (for example, FeO, $Fe_2O_3$ and $Fe_3O_4$), titanium oxide (for example, $TiO_2$), cerium oxide (for example, $CeO_2$), zinc oxide (for example, ZnO), and zirconium oxide (for example, $ZrO_2$). In another aspect, an elastomer formulation comprising a modified silicone resin of Formula (I) and Formula (II) is provided, wherein the at least one metal oxide is selected from at least one of iron oxide (for example, FeO, $Fe_2O_3$ and $Fe_3O_4$) and titanium oxide (for example, $TiO_2$).

In another aspect, an elastomer formulation comprising a modified silicone resin of Formula (I) and Formula (II) is provided, wherein the at least one metal oxide can have a particle diameter size ranging from, for example, about 1 nanometer to about 5 micrometers, from about 25 nanometers to about 2 micrometers, and/or from about 50 nanometers to about 500 nanometers.

In another aspect, an elastomer formulation comprising a modified silicone resin of Formula (I) and Formula (II) is provided, wherein the at least one silicate is at least one of ethyl silicate, methyl silicate, isopropyl silicate, or butyl silicate.

In another aspect, an elastomer formulation comprising a modified silicone resin of Formula (I) and Formula (II) is provided, wherein the optional at least one silica can be fumed silica, functionalized silica, among others.

In another aspect, an elastomer formulation comprising a modified silicone resin of Formula (I) and Formula (II) is provided, wherein the exemplary modified silicone resins of Formula (I) are listed in Table I and wherein the exemplary modified silicone resins of Formula (II) are listed in Table III.

In another aspect, an elastomer formulation comprising a modified silicone resin of Formula (I) in combination with a modified silicone resin of Formula (II) is provided, wherein values for n, m and p of Formula (I) provide an overall resin combination having a viscosity ranging from about 500 cSt to about 10,000 cSt. In another aspect, an elastomer formulation comprising a modified silicone resin of Formula (I) in combination with a modified silicone resin of Formula (II) is provided, wherein values for t, y and z of Formula (II) provide an overall resin combination having a viscosity ranging from about 500 cSt to about 10,000 cSt. In another aspect, an elastomer formulation comprising a modified silicone resin of Formula (I) in combination with a modified silicone resin of Formula (II) is provided, wherein values for n, m and p of Formula (I) and wherein values for t, y and z of Formula (II), provide an overall resin combination having a viscosity ranging from about 500 cSt to about 10,000 cSt.

In another aspect, an elastomer formulation comprising a modified silicone resin of Formula (I) is provided, wherein ratio of n to m ranges from about 1:1 to about 1:200; in combination with a modified silicone resin of Formula (II), and wherein ratio of t to y ranges from about 1:1 to about 1:200.

In another aspect, elastomer formulations comprising the following compositions are disclosed: (a) a modified silicone resin of Formula (I) and Formula (II) (each independently) present in an amount ranging from about 5 weight-percent to about 95 weight-percent; (b) at least one metal oxide present in an amount ranging from about 2 weight-percent to about 80 weight-percent; (c) at least one silicate present in an amount ranging from about 0 weight-percent to about 25 weight-percent; (d) optionally at least one silica present in an amount ranging from about 0 weight-percent to about 20 weight-percent; and (e) at least one curing agent present in an amount ranging from about 0.10 weight-percent to about 10 weight-percent, provided that the total amount of the components sums to 100 weight-percent for neat formulations.

General Synthetic Schemes

The compounds of the present invention can be prepared using the methods illustrated in the general synthetic schemes and experimental procedures detailed below. These general synthetic schemes and experimental procedures are presented for purposes of illustration and are not intended to be limiting. The starting materials used to prepare the compounds of the present invention are commercially available or can be prepared using routine methods known in the art. Representative procedures for the preparation of modified silicone resins of Formula (I) and Formula (II) are outlined below in Schemes I-III.

A modified silicone resin of Formula (I) is prepared with methyl/phenyl phosphonic acid or methyl/phenyl phosphonic dichloride. An exemplary direct coupling reaction is presented in Scheme I.

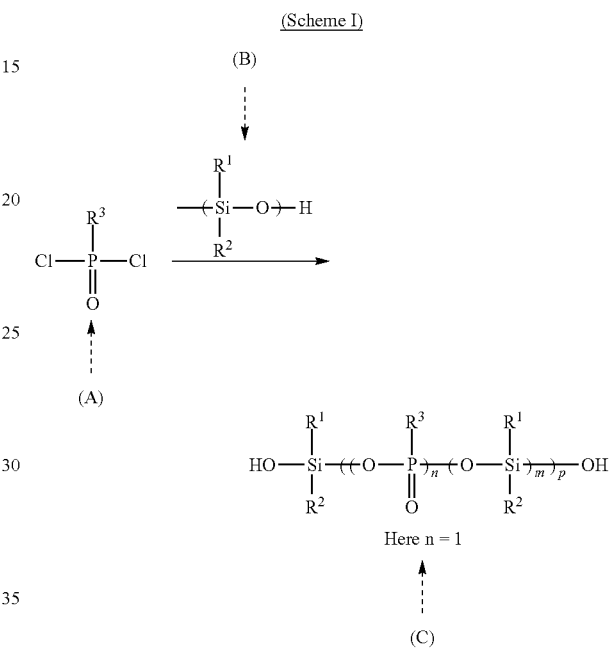

(Scheme I)

Structure (C) is an example of Formula (I). The ratios of the starting materials in Scheme I will affect the molecular weights and viscosities of the modified silicone resins as well as the thermal capability of the elastomers. The mole ratios of phosphorous units (A) to starting siloxane oligomeric unit (B) (that is, [—O—Si($R^1$)($R^2$)—]), ranging from about 0.55 to about 1, can provide modified silicone resins (C) with viscosities ranging from about 500 cSt to about 10,000 cSt, as measured by a viscometer. Elastomer formulations displaying improved thermal resistance and maintaining superior mechanical properties can be prepared with modified silicone resins that include a mole ratio of phosphorous units (that is, [—O—P(O)($R^3$)—] of resin (C)) to single siloxane oligomeric units (that is, [—O—Si($R^1$)($R^2$)—] of resin (C))) ranging from about 1:4 to about 1:100.

In terms of Formula (I), the values for n, m and p can be adjusted to provide tunable resin compounds of Formula (I) with a viscosity ranging from about 500 cSt to about 10,000 cSt, as measured by a viscometer. Likewise, the ratio of n to m of resin compounds of Formula (I) ranges from about 1:1 to about 1:200.

A modified silicone resin of Formula (II) can be prepared in several different types of reactions. For example, 1,4-bis (hydroxydimethylsilyl)-benzene has two hydroxyl groups on silicone atoms that display different reactivity as compared to hydroxyl-terminated siloxanes. Thus, a two-step process is used to include phenyl material into the silicone backbone and hydroxyl as the terminating groups as shown below in Schemes II and III.

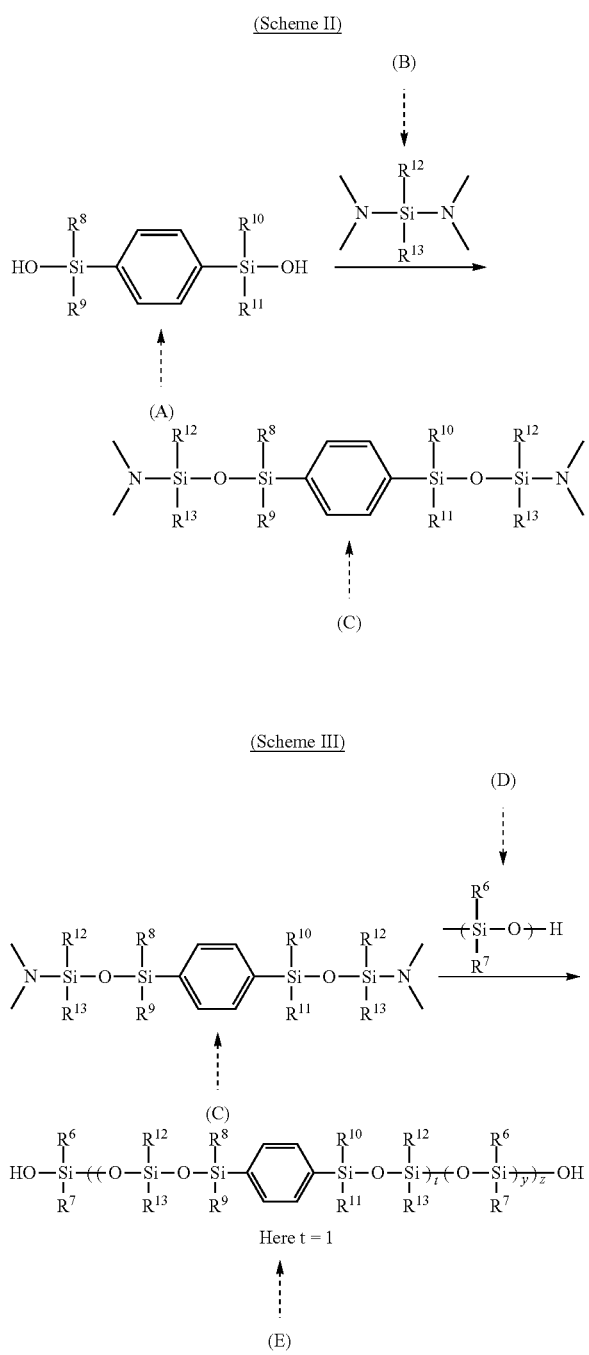

As shown in Scheme II, the first step is the amination of 1,4-bis(hydroxydimethylsilyl)-benzene species (A) with bis(dimethylamino)dimethylsilane (B) to form the amidated phenyl species (C), which is usually performed in an organic solvent, such as toluene, at a temperature ranging from about 80° C. to about 140° C. As shown in Scheme III, the second step is the direct coupling of siloxane oligomer (D) and the phenyl unit (C) with production of the modified silicone resin (E) and the release of dimethylamine (not shown). Schemes II and III can be performed sequentially in the same reaction vessel under the same conditions (for example, in the same organic solvent).

Schemes I-III are typically performed in an organic solvent. Common organic solvents used can be aprotic solvents comprising toluene, benzene, tetrahydrofuran (THF), acetonitrile, and N,N-dimethylformamide (DMF), among others.

Structure (E) in Scheme III is a species of Formula (II). The mole ratio of the two starting components of Scheme III (comprising the reaction conditions) determines the molecular weights and viscosities of the resultant modified silicone resins. The ratios of the aminated phenyl species (C) to siloxane units in oligomer (D) can range from about 0.55 to about 1 in Scheme III to provide the resultant modified silicone resins (E) having viscosities ranging from about 500 cSt to about 10,000 cSt, as measured by a viscometer. Because the hydroxyl-terminated siloxane can be used in an excess amount, modified silicone resins will also be hydroxyl-terminated. Such hydroxyl groups are attached to siloxane and are readily polymerizable.

The mole ratio of phenyl units to single siloxane oligomeric units in modified silicone resin is an additional important consideration related to thermal resistant properties of the resultant elastomer formulations. The starting siloxane oligomers can contain various numbers of single siloxane units (for example, $-Si(CH_3)_2-O-$). The thermal resistant properties of the resultant modified silicone resins should be improved with increasing numbers of phenyl units present. However, elastomers containing such highly phenyl-substituted silicone resins can display compromised mechanical properties. Thus, elastomer formulations displaying improved thermal resistance and maintaining superior mechanical properties can be prepared with modified silicone resins that include a ratio of phenyl units to single siloxane units from about 1:5 to about 1:200.

In terms of Formula (II), the values for t, y and z can be adjusted to provide tunable resin compounds of Formula (II) with a viscosity ranging from about 500 cSt to about 10,000 cSt, as measured by a viscometer. Likewise, the ratio of t to y of resin compounds of Formula (II) ranges from about 1:1 to about 1:200.

For reactions that yield a modified silicone resin of Formula (I), bi-functional phosphorous groups can include, for example, methylphosphonic dichloride, phenylphosphonic dichloride, methyl dichlorophosphate, methylphosphonic acid, phenylphosphonic acid, and phenyl dichlorophosphate, among others.

For reactions that yield a modified silicone resin of Formula (II) having benzene groups, bifunctional benzene groups can include, for example, 1,4-bis(hydroxyldimethylsilyl)benzene, 1,3-bis(hydroxyldimethylsilyl)benzene, 1,4-bis(dimethylsilyl)benzene, 1,3-bis(dimethylsilyl) benzene, 1,4-dihalogenbenzene, and 1,3-dihalogen benzene.

For reactions that yield a modified silicone resin of Formula (I) or (II) having siloxane groups, bi-functional siloxanes can include, for example, α,ω-dichlorosiloxanes or α,ω-dihydroxylsiloxanes with molecular weights from about 400 to about 10,000.

Polymerization reaction resulting in production of the modified silicone resins is performed under an inert atmosphere condition. The reaction temperature for modified silicone resins can be from about room temperature to about 140° C. Reactions can be performed under neat conditions or with a suitable organic solvent. Suitable organic solvents used can be aprotic solvents comprising toluene, benzene, tetrahydrofuran (THF), acetonitrile, and N,N-dimethylformamide (DMF), among others.

The elastomer formulations comprising the foregoing various compositions can be thoroughly mixed manually or by a mixer equipment, degassed under vacuum, casted into a mold, and left at ambient condition. The elastomers can be cured from about 30 min to about 2 days.

EXAMPLES

The following examples are merely illustrative, and do not limit this disclosure in any way. Example 1 describes the preparation of a modified silicone. Examples 2-8 describe synthetic procedures for modified silicone resins (i), (ii), and (iv) of Formula (I) and modified silicone resins (3), (4), (5) of Formula (II). Example 9 describes procedure for preparing an elastomer formulation comprising modified silicone resin (2). Example 10 describes procedure for preparing an elastomer formulation comprising modified silicone resins (2) and (ii).

Modified Silicone Resins

Example 1: Modified Silicone M101

To a solution of 1,4-bis(hydroxydimethylsilyl)benzene (2.575 g, Gelest) in toluene at 110° C. was slowly added bis(dimethylamino)vinylmethylsilane (1.66 g, Gelest) under inert atmosphere within 2 h. The mixture was stirred at 110° C. for 2 h and then solvent was evaporated, yielding the modified silicone material M101.

Example 2: Modified Silicone Resin (3) of Formula (II)

To a solution of 1,4-bis(hydroxydimethylsilyl)benzene (5.0 g, Gelest) in toluene at 110° C. was slowly added bis(dimethylamino)dimethylsilane (6.75 g, Gelest). The mixture was stirred at 110° C. overnight and then the solvent was removed by vacuum. Polydimethylsiloxane (16.2 g) (Mn 550, Gelest) was added to the mixture and stirred at 80° C. overnight, yielding a viscous modified silicone resin (3).

Example 3: Modified Silicone Resin (4) of Formula (II)

To a solution of 1,4-bis(hydroxydimethylsilyl)benzene (2.055 g, Gelest) in toluene was added bis(dimethylamino) vinylmethylsilane (1.82 g, Gelest) under dinitrogen atmosphere. The mixture was stirred at 80° C. for 10 min then raised to 110° C. A liquid of vinylmethylsiloxane-dimethylsiloxane copolymer (Mn ~600, 3.151 g, Gelest) was then added and the mixture was stirred at 110° C. for 22 h to produce the viscous resin (4).

Example 4: Modified Silicone Resin (5) of Formula (II)

A mixture of 1,4-bis(hydroxydimethylsilyl)benzene (4.65 g, Gelest), 1,3-dichloro-1,1,3,3-tetramethyldisiloxane (3.06 g, Gelest) and 1,7-dichloro-octamethyltetrasiloxane (5.41 g, Gelest) was mixed at room temperature for 1 h, 30° C. 1 h, 50° C. 1 h, and 110° C. 63 h. To this solution was added silanol-terminated diphenylsiloxane-dimethylsiloxane copolymer (Mw 950, Gelest) and vinylmethylsiloxane-dimethylsiloxane copolymer (Mn ~600, Gelest). The mixture was stirred at 110° C. for 24 h to yield viscous resin (5).

Example 5: Modified Silicone Resin (i) of Formula (I)

A mixture of methylphosphonic acid (6.4 g, Aldrich) and polydimethylsiloxane (Mn 550, 48.7 g, Gelest) in toluene was stirred at 150° C. for 24 h. Removal of toluene yielded viscous modified silicone resin (i).

Example 6: Modified Silicone Resin (ii) of Formula (I)

Phenylphosphonic dichloride (7.0 g, Aldrich) was added into 26.3 g of polydimethylsiloxane (Mn 550, Gelest) and the mixture was stirred at room temperature under vacuum overnight. Mixture became viscous and was ready for elastomer formulations.

Example 7: Modified Silicone Resin (ii) of Formula (I)

A mixture of phenylphosphonic acid (28.5 g, Aldrich) and polydimethylsiloxane (Mn 550,116.6 g, Gelest) was dissolved in toluene in a 500-mL round-bottom flask equipped with a stirrer, a Dean-Stark trap and a condenser. The flask was heated at 70° C. for 15 h followed by heating at 110° C. for 3 h. The mixture was then raised to 150° C. to collect water (6.5 mL). Toluene was removed by vacuum and the viscous modified silicone resin (ii) product was collected.

Example 8: Modified Silicone Resin (iv) of Formula (I)

A mixture of methylphosphonic acid (2.0 g, Aldrich), 1,3-dichloro-1,1,3,3-tetramethyldisiloxane (2.57 g, Aldrich) and 1,7-dichloro-octamethyltetrasiloxane (4.53 g, Aldrich) was stirred at 80° C. for 24 hours. To this solution was added silanol-terminated diphenylsiloxane-dimethylsiloxane copolymer (4.6 mL, Gelest). The mixture was heated at 100° C. for 68 h and produced a resin with viscosity at ~1500 cP.

Elastomer Formulations:

The elastomer formulations disclosed herein can include at least one modified silicone resin having the structure of Formulas (I) and/or (II), at least one type of metal oxide, optionally at least one silicate (e.g., ethyl silicate), optionally at least one silica, and at least one curing agent. The modified silicone resin(s) can represent from about 10 weight-percent to about 95 weight-percent of the elastomer formulation. The metal oxide of the elastomer formulation includes oxide particulates having a particle size (diameter) ranging from about 1 nanometer to about 5 micrometers. The elastomer formulations can include a metal oxide from about 2 weight-percent to about 80 weight-percent in the formulation. Elastomer formulations may use iron oxide (for example, FeO, $Fe_2O_3$ and $Fe_3O_4$), titanium oxide (for example, $TiO_2$), cerium oxide (for example, $CeO_2$), zinc oxide (for example, ZnO), and zirconium oxide (for example, $ZrO_2$), or a mixture of these oxides. Ethyl silicate can be present from about 0 weight-percent to about 25 weight-percent in the elastomer formulations. Silica can be present from about 0 weight-percent to about 10 weight-percent in the elastomer formulations. Curing agent can be present from about 0.1 weight-percent to about 10 weight-percent in the elastomer formulations. Suitable curing agents include, for example, organometallic catalysts (e.g., dibutyltin dilaurate, tris(dimethylamino)methylsilane; and ethyltriacetoxysilane, among others, as well as combinations thereof), which are well known in the art for promoting condensation reaction. The disclosed weight-percent of the aforementioned components provides a total amount of components summing to 100 weight-percent for neat formulations.

Example 9: Elastomer Formulation #102

To a container of 200 mL were added red iron oxide (22.5 g), modified silicone resin (2) (26.0 g), and ethyl silicate (1.25 g). The mixture was thoroughly mixed together followed by the addition of dibutyltin dilaurate (0.26 g). The material mixture was mixed, degassed, casted onto a Teflon mold, and left at room temperature for 24 hours to produce elastomer #102.

Example 10: Elastomer Formulation #104

A mixture of modified silicone resin (2) (22.5 g), modified silicone resin (ii) (4.0 g), iron oxide (22.0 g), and ethyl silicate (1.25 g) were thoroughly mixed together. The dibutyltin dilaurate (0.25 g) was added to the mixture thereafter, followed by thorough mixing, degassing, and casting. The sample was left at room temperature for 24 hours, producing the cured silicone elastomer #104.

Example 11: Exemplary Elastomer Formulations

Exemplary elastomer formulations are presented in Table IV. These formulations were made using procedures similar to those described in Example 10.

The performance attributes of select elastomer formulations comprising a modified silicone resin(s) are presented in Table V. As can be seen from Table V, the mechanical properties of the resultant formulations that include the modified silicone resins of Formula (I), Formula (II), or Formula (I)+Formula (II), remain robust even after extensive aging at 316° C.

TABLE V

Properties of Exemplary Elastomer Formulations.

| | As-Prepared samples | | Samples after aging in 316° C. | |
|---|---|---|---|---|
| Formulations # | Elongation (%, RT) | Tensile Strength (MPa, RT) | Hours in 316° C. | Elongation (%, RT) | Tensile Strength (MPa, RT) |
| 102 | 142.8 | 3.4 | 2014 | 5.32 | 6.95 |
| 104 | 238.1 | 1.96 | 2014 | 12.6 | 6.79 |
| 112 | 79.1 | 1.55 | 2013 | 5.0 | 4.0 |
| 113 | 104.2 | 3.99 | 2011 | 12.3 | 5.48 |
| 114 | 122.1 | 3.30 | 2011 | 45.0 | 2.37 |
| 115 | 56.7 | 1.52 | 2011 | 5.8 | 3.68 |
| 116 | 205 | 12.06 | 2009 | 10.9 | 5.2 |
| 117 | 23.4 | 1.72 | 2009 | 23.4 | 2.64 |
| 118 | 15.2 | 1.19 | 2009 | 30.7 | 3.63 |
| 119 | 832.6 | 11.5 | 2009 | 8.36 | 4.64 |
| 120 | 208.2 | 2.7 | 2009 | 6.24 | 3.38 |
| 121 | 262.4 | 5.35 | 1000 | 46.7 | 4.33 |
| 122 | 291.6 | 11.2 | 2017 | 11.7 | 1.5 |
| 123 | 218.8 | 4.1 | 2017 | 10.7 | 4.64 |

TABLE IV

Exemplary Elastomer Formulations.[1]

| Formulation # | Starting Resin[2] (% w/w) | Starting Resin[2] (% w/w) | Iron oxide[3] (% w/w) | Ethyl silicate[4] (% w/w) | Curing agent[5] (% w/w) |
|---|---|---|---|---|---|
| 102 | 52 (Resin (2)) | | 45 | 2.5 | 0.5 (a) |
| 104 | 45 (Resin (2)) | 8 (Resin (ii)) | 44 | 2.5 | 0.5 (a) |
| 105 | 46 (Resin (2)) | 7 (Resin (i)) | 44 | 2.5 | 0.5 (a) |
| 106 | 49.5 (Resin (2)) | | 45 | 5 | 0.5 (a) |
| 107 | 50.5 (Resin (2)) | | 45 | 4 | 0.5 (a) |
| 108 | 49.5 (Resin (2)) | 6 (Resin (i)) | 44 | | 0.5 (a) |
| 109 | 50 (Resin (2)) | | 45 | | 5 (b) |
| 110 | 59 (Resin (2)) | | 36 | | 5 (b) |
| 111 | 47 (Resin (2)) | 5 (Resin (i)) | 44 | | 4 (b) |
| 112 | 52.5 (Resin (1)) | | 45 | 2 | 0.5 (a) |
| 113 | 49.5 (Resin (1)) | | 45 | 5 | 0.5 (a) |
| 114 | 52 (Resin (1)) | | 45 | 2.5 | 0.5 (a) |
| 115 | 6.55 (Resin (2)) | 55.7 (Resin (i)) | 27.11 | 1.96, 8.14($SiO_2$) | 0.54 (a) |
| 116 | 24.7 (Resin (1)) | 24.7 (Resin (1)) | 43 ($TiO_2$) | | 7.6 (c) |
| 117 | 25.5 (Resin (1)) | 25.5 (Resin (1)) | 43 | | 6 (c) |
| 118 | 49.5 (Resin (1)) | | 42.5 | | 0.5 (a), 7.5 (c) |
| 119 | 62.95 (Resin (1)) | | 34.55 | | 2.5 (c) |
| 120 | 73.5 (Resin (1)) | | 25 | | 1.5 (b) |
| 121 | 32.25 (Resin (1)) | 32.25 (Resin (1)) | 33 | | 2.5 (b) |
| 122 | 32 (Resin (1)) | 32 (Resin (1)) | 33 ($TiO_2$) | | 3 (b) |
| 123 | 29 (Resin (1)) | 29 (Resin (1)) | 27, 12 ($TiO_2$) | | 3 (c) |
| 124 | 61 (Resin (2)) | | 24, 12 ($TiO_2$) | | 3 (b) |
| 125 | 58.5 (Resin (2)) | | 36 ($TiO_2$) | 5 | 0.5 (a) |
| 126 | 58.5 (Resin (2)) | | 24, 12 ($TiO_2$) | 5 | 0.5 (a) |

[1]Numerical values represent weight-percent contribution of component to elastomer formulation.
[2]Starting resin(s) correspond to those resins having the structure presented in Tables I and III.
[3]Iron oxide at the weight-percent contribution in the elastomer formulation is presented. When $TiO_2$ replaces the iron oxide in the elastomer formulation, then only the weight-percent contribution of $TiO_2$ is presented (e.g., Formulations 116, 122 and 125). When $TiO_2$ supplements the iron oxide in the elastomer formulation, then the first weight-percent contribution reflects that of iron oxide and the second weight-percent contribution reflects that of $TiO_2$ (e.g., Formulations 123, 124 and 126).
[4]Ethyl silicate at the weight-percent contribution in the elastomer formulation is presented. When $SiO_2$ supplements the ethyl silicate in the elastomer formulation, then the first weight-percent contribution reflects that of ethyl silicate and the second weight-percent contribution reflects that of $SiO_2$ (e.g., Formulation 115).
[5]Curing agents: a - dibutyltin dilaurate; b - tris(dimethylamino)methylsilane; c - ethyltriacetoxysilane TABLE V-continued Properties of Exemplary Elastomer Formulations.

| Formulations # | As-Prepared samples | | Samples after aging in 316° C. | | |
|---|---|---|---|---|---|
| | Elongation (%, RT) | Tensile Strength (MPa, RT) | Hours in 316° C. | Elongation (%, RT) | Tensile Strength (MPa, RT) |
| 124 | 211.1 | 4.28 | 2017 | 1.2 | 2.4 |
| 125 | 140.3 | 6.22 | 2011 | 6.23 | 4.19 |
| 126 | 142.3 | 3.92 | 2011 | 3.2 | 7.2 |

Elastomer Formulation Applications

The elastomer formulations that include a modified silicone resin(s) of Formula (I), Formula (II), or Formula (I) in combination with Formula (II), are amenable to industrial applications that require elastomer performance under high temperature conditions. These applications include use of the elastomer formulations for coatings, sealants, and gap-filling measures, among others.

To the extent that the present application references a number of documents, those documents are hereby incorporated by reference herein in their entirety.

While the present disclosure has been described with reference to certain embodiments, it will be understood by those skilled in the art that various changes may be made and equivalents may be substituted without departing from the scope of the present disclosure. In addition, modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary.

What is claimed is:

1. A silicone resin of Formula (I):

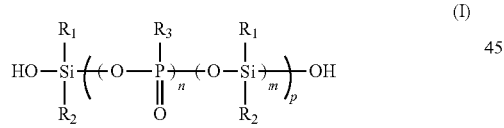

(I)

wherein each of $R^1$, $R^2$, and $R^3$ is independently selected from the group consisting of H, alkyl, alkenyl, alkynyl, and aryl;
n ranges from 1 to 10;
m ranges from 1 to 200; and
p ranges from 2 to 1,000.

2. The silicone resin of claim 1, wherein:
m ranges from 1 to 100; and
p ranges from 10 to 500.

3. The silicone resin of claim 2, wherein:
each of $R^1$, $R^2$, and $R^3$ is independently selected from the group consisting of H, $C_{1-8}$ alkyl, $C_{2-8}$ alkenyl, $C_{2-8}$ alkynyl, and aryl.

4. The silicone resin of claim 3, wherein:
each of $R^1$, $R^2$, and $R^3$ is independently selected from the group consisting of methyl, ethyl, propyl, butyl, ethylenyl, propylenyl, butylenyl, acetylenyl, diacetylenyl, and aryl.

5. The silicone resin of claim 4, wherein:
each of $R^1$, $R^2$, and $R^3$ is independently selected from the group consisting of methyl and phenyl.

6. The silicone resin of claim 5, wherein the silicone resin is selected from the group consisting of:

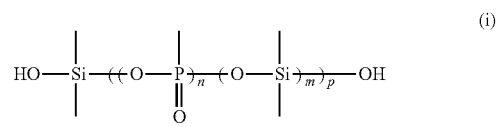

(i)

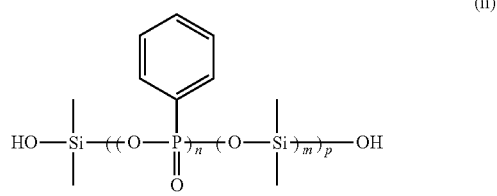

(ii)

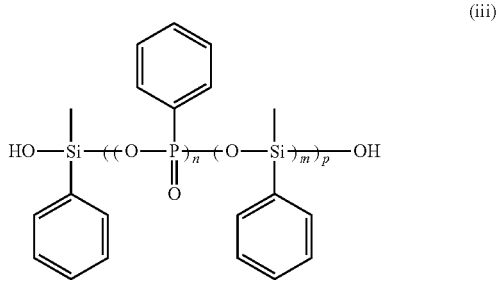

(iii)

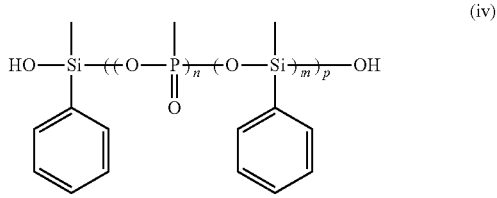

(iv)

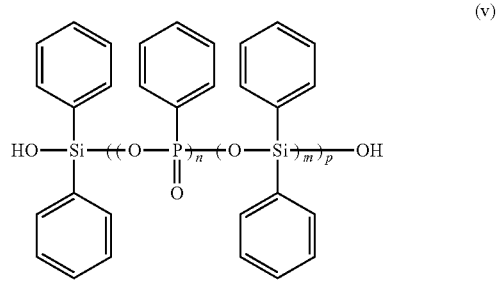

(v)

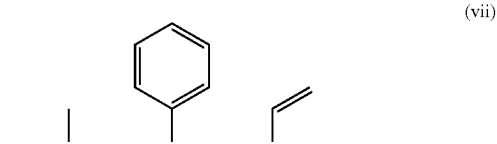

(vii)

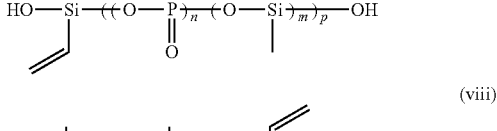

(viii)

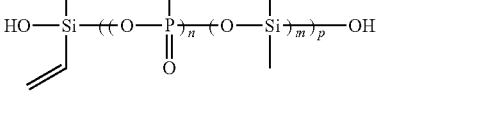

and wherein;
n ranges from 1 to 10;
m ranges from 5 to 100; and
p ranges from 10 to 500.

7. The silicone resin of claim 1, wherein the ratio of n to m is between about 1:1 to about 1:2000.

8. The silicone resin of claim 7, wherein the ratio of n to m is between about 1:4 and about 1:200.

9. A formulation comprising the silicone resin of claim 1 and a curing agent.

10. A formulation comprising:
at least one silicone resin of Formula (I):

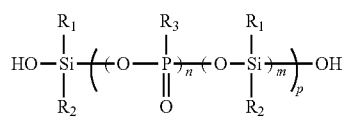

wherein each of $R^1$, $R^2$, and $R^3$ is independently selected from the group consisting of H, alkyl, alkenyl, alkynyl, and aryl;
n ranges from 1 to 10;
m ranges from 1 to 200; and
p ranges from 2 to 1,000; and
at least one metal oxide.

11. The formulation of claim 10, further comprising at least one curing agent selected from the group consisting of dibutyltin dilaurate, tris(dimethylamino)methylsilane, and ethyltriacetoxysilane.

12. The formulation of claim 11, wherein the curing agent is dibutyltin dilaurate.

13. The formulation of claim 10, wherein:
n ranges from 1 to 3;
m ranges from 1 to 100; and
p ranges from 10 to 500.

14. The formulation of claim 10, wherein:
each of $R^1$, $R^2$, and $R^3$ is independently selected from the group consisting of H, $C_{1-8}$ alkyl, $C_{2-8}$ alkenyl, $C_{2-8}$ alkynyl, and aryl.

15. The formulation of claim 14, wherein:
each of $R^1$, $R^2$, and $R^3$ is independently selected from the group consisting of methyl, ethyl, propyl, butyl, ethylenyl, propylenyl, butylenyl, acetylenyl, diacetylenyl, and aryl.

16. The formulation of claim 15, wherein:
each of $R^1$, $R^2$, and $R^3$ is independently selected from the group consisting of methyl and phenyl.

17. The formulation of claim 16, wherein: the at least one silicone resin comprises at least one of the following:

(i)
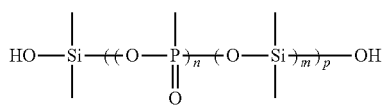

(ii)
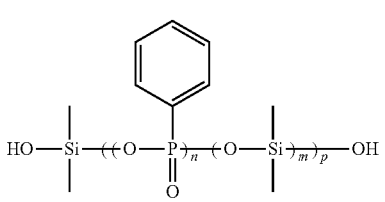

(iii)
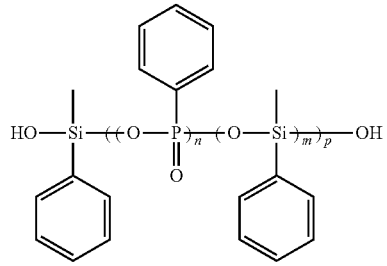

(iv)
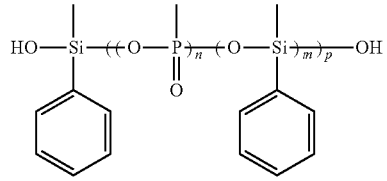

(v)
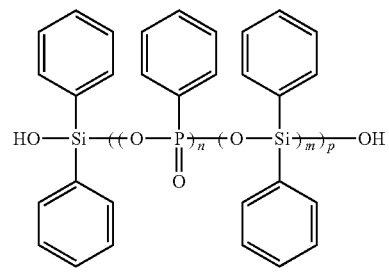

(vii)
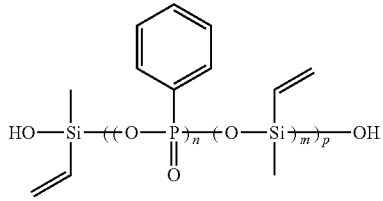

(viii)
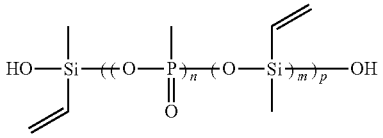

and wherein:
n ranges from 1 to 10;
m ranges from 5 to 100; and
p ranges from 10 to 500.

18. The formulation of claim 10, wherein the at least one metal oxide is selected from the group consisting of FeO, $Fe_2O_3$, $Fe_3O_4$, $TiO_2$, $CeO_2$, ZnO, $ZrO_2$ and $TiO_2$.

19. The formulation of claim 10, wherein the at least one metal oxide has a particle diameter size ranging from about 1 nm to about 5 μm.

20. The formulation of claim 19, wherein the at least one metal oxide has a particle diameter size from about 25 nm to about 2 μm.

21. The formulation of claim 20, wherein the at least one metal oxide has a particle diameter size from about 50 nm to about 500 nm.

22. The formulation of claim 10, wherein values for n, m and p provide a resin of Formula (I) having a viscosity ranging from about 500 cSt to about 10,000 cSt.

23. The formulation of claim 10, wherein a ratio of n to m ranges from about 1:1 to about 1:200.

24. The formulation of claim 10, further comprising:
at least one silicone resin of Formula (II):

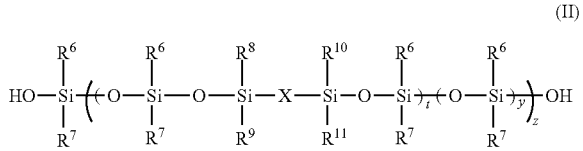 (II)

wherein each of $R^6$, $R^7$, $R^8$, $R^9$, $R^{10}$, and $R^{11}$ is independently selected from the group consisting of H, alkyl, alkenyl, alkynyl, and aryl;
X is selected from the group consisting of arylene, transition metal, inorganic oxide, and silsesquioxane;
t ranges from 1 to 10;
y ranges from 1 to 200; and
z ranges from 1 to 1,000.

25. The silicone resin of claim 24, wherein:
t ranges from 1 to 3;
y ranges from 1 to 100; and
z ranges from 10 to 500.

26. The formulation of claim 24, wherein:
each of $R^6$, $R^7$, $R^8$, $R^9$, $R^{10}$, and $R^{11}$ is independently selected from the group consisting of H, $C_{1-8}$ alkyl, $C_{2-8}$ alkenyl, $C_{2-8}$ alkynyl, and aryl.

27. The formulation of claim 26, wherein:
each of $R^6$, $R^7$, $R^8$, $R^9$, $R^{10}$, and $R^{11}$ is independently selected from the group consisting of methyl, ethyl, propyl, butyl, ethylenyl, propylenyl, butylenyl, acetylenyl, diacetylenyl, and aryl.

28. The formulation of claim 27, wherein:
each of $R^6$, $R^7$, $R^8$, $R^9$, $R^{10}$, and $R^{11}$ is independently selected from the group consisting of methyl and phenyl.

29. The formulation of claim 10, further comprising at least one silicate.

30. The formulation of claim 29, wherein the at least one silicate comprises at least one of ethyl silicate, methyl silicate, isopropyl silicate and butyl silicate.

31. The formulation of claim 10, further comprising:
at least one silicate; and
at least one silica.

32. The formulation of claim 31, wherein:
the at least one silicate comprises at least one of ethyl silicate, methyl silicate, isopropyl silicate and butyl silicate; and
wherein the at least one silica comprises at least one of fumed silica and functionalized silica.

33. The formulation of claim 32, wherein:
the metal oxide is $Fe_2O_3$ having a particle size ranging from about 0.5 μm to about 5 μm.

34. The formulation of claim 24, wherein X is arylene and a ratio of arylene units to siloxane units of formula (II) is between about 1:5 and about 1:200.

35. A formulation comprising:
at least one silicone resin having a tensile strength of between about 3.6 MPa and about 6.8 MPa at room temperature and represented by Formula (I):

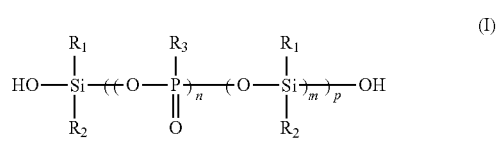 (I)

wherein each of $R^1$, $R^2$, and $R^3$ is independently selected from the group consisting of H, alkyl, alkenyl, alkynyl, and aryl;
n ranges from 1 to 10;
m ranges from 1 to 200; and
p ranges from 2 to 1,000; and
at least one metal oxide.

36. An elastomer that is the reaction product of:
a siloxane of formula:

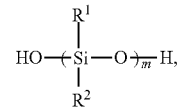

wherein each of $R^1$ and $R^2$ is independently selected from the group consisting of H, alkyl, alkenyl, alkynyl, and aryl, wherein m ranges from 1 to 200; and
a phosphonic compound of formula:

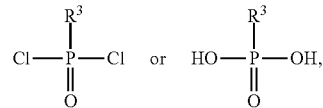

wherein $R^3$ is selected from the group consisting of H, alkyl, alkenyl, alkynyl, and aryl.

37. The elastomer of claim 36, wherein the molar ratio of phosphonic compound to siloxane is between about 0.55 and about 1.

38. The elastomer of claim 36, wherein $R^3$ is methyl or phenyl.

* * * * *

UNITED STATES PATENT AND TRADEMARK OFFICE
CERTIFICATE OF CORRECTION

PATENT NO. : 9,932,475 B2
APPLICATION NO. : 15/061459
DATED : April 3, 2018
INVENTOR(S) : Chaoyin Zhou et al.

It is certified that error appears in the above-identified patent and that said Letters Patent is hereby corrected as shown below:

On the Title Page

Item (57), Line 4, delete "The" and insert -- the --, therefor.

In the Specification

Column 1, Line 8, delete "Jul. 7, 2014." and insert -- Jul. 11, 2014. --, therefor.

Signed and Sealed this
Twenty-sixth Day of February, 2019

Andrei Iancu
*Director of the United States Patent and Trademark Office*